(12) United States Patent
O'Keeffe

(10) Patent No.: US 10,631,123 B2
(45) Date of Patent: **\*Apr. 21, 2020**

(54) SYSTEM AND METHOD FOR USER PROFILE ENABLED SMART BUILDING CONTROL

(71) Applicant: James Thomas O'Keeffe, Newark, CA (US)

(72) Inventor: James Thomas O'Keeffe, Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,727

(22) Filed: Nov. 7, 2016

(65) Prior Publication Data

US 2017/0055126 A1 Feb. 23, 2017

Related U.S. Application Data

(63) Continuation-in-part of application No. 14/863,259, filed on Sep. 23, 2015, now Pat. No. 9,520,250.

(60) Provisional application No. 62/054,389, filed on Sep. 24, 2014, provisional application No. 62/273,435, filed on Dec. 31, 2015.

(51) Int. Cl.
*H04W 4/02* (2018.01)
*H04W 4/21* (2018.01)
*H04W 4/80* (2018.01)

(52) U.S. Cl.
CPC ............ *H04W 4/023* (2013.01); *H04W 4/21* (2018.02); *H04W 4/80* (2018.02)

(58) Field of Classification Search
CPC .. H04W 64/00; H04W 4/02; H04L 29/08657; H01H 2239/048; H01H 9/02; H01H 9/0271
See application file for complete search history.

(56) References Cited

U.S. PATENT DOCUMENTS

| | | | |
|---|---|---|---|
| 3,927,402 A | 12/1975 | Thompson | |
| 5,914,826 A | 6/1999 | Smallwood | |
| 6,091,037 A | 7/2000 | Bachschmid | |
| 7,299,892 B2 | 11/2007 | Radu | |
| 7,608,948 B2 | 10/2009 | Nearhoof | |
| 8,666,104 B2 | 3/2014 | Ivey | |
| 8,675,887 B2 | 3/2014 | Yuan | |
| 9,104,886 B1 * | 8/2015 | Dolbakian | G06F 21/62 |

(Continued)

*Primary Examiner* — Qun Shen

(57) ABSTRACT

A central controller for device automation can control output devices (e.g. automated lights and speakers) based on calculating the indoor location of a person. In familiar surroundings (e.g. homes), people may leave their favorite wireless devices unattended (e.g. smartphones and tablet PCs) and in general people exhibit varying proximity to their mobile wireless devices. Hence, the indoor locations of mobile wireless devices are of variable importance when calculating indoor occupant locations. (e.g. exhibiting highly-correlated locations when handheld). In one embodiment, the central controller aggregates wireless signals from mobile wireless devices. The central controller calculates one or more mobile device location estimates and person-to-device proximities from the wireless signals. The central controller uses each person-to-device proximity to weight the corresponding mobile device location in a calculation to estimate the occupancy of the region of the building and controls an output device based on the occupancy estimate.

16 Claims, 16 Drawing Sheets

(56) References Cited

U.S. PATENT DOCUMENTS

| | | |
|---|---|---|
| 2005/0237218 A1 | 10/2005 | Tang |
| 2006/0038677 A1* | 2/2006 | Diener ............... G01R 29/0871 |
| | | 340/540 |
| 2006/0161270 A1 | 7/2006 | Luskin |
| 2007/0289860 A1 | 12/2007 | Newman |
| 2011/0045840 A1* | 2/2011 | Alizadeh-Shabdiz .... G01S 5/02 |
| | | 455/456.1 |
| 2011/0167357 A1* | 7/2011 | Benjamin ........... H04L 12/1818 |
| | | 715/753 |
| 2011/0181201 A1 | 7/2011 | Hollis |
| 2012/0309410 A1* | 12/2012 | Marti .................... H04W 4/028 |
| | | 455/456.1 |
| 2013/0165145 A1* | 6/2013 | Alles ...................... G01S 5/021 |
| | | 455/456.1 |
| 2014/0107846 A1* | 4/2014 | Li ........................... H04W 4/04 |
| | | 700/275 |
| 2014/0243013 A1* | 8/2014 | Liu ..................... H04W 64/003 |
| | | 455/456.1 |
| 2014/0266669 A1* | 9/2014 | Fadell .................. G05B 19/042 |
| | | 340/501 |
| 2014/0270237 A1 | 9/2014 | Wang |
| 2014/0270264 A1 | 9/2014 | Wang |
| 2015/0061859 A1* | 3/2015 | Matsuoka ............... G08B 27/00 |
| | | 340/501 |
| 2015/0334523 A1* | 11/2015 | Lappetelainen ........ H04W 4/80 |
| | | 455/456.1 |

\* cited by examiner

SYSTEM AND METHOD FOR USER PROFILE ENABLED SMART BUILDING CONTROL

CROSS-REFERENCE TO RELATED APPLICATIONS

This application is a continuation-in-part of application Ser. No. 14/863,259 filed on Sep. 23, 2015, titled "MOBILE DEVICE ASSISTED SMART BUILDING CONTROL", the disclosure of which is hereby incorporated herein by reference in its entirety and for any and all purposes and which claims the benefit of provisional patent application Ser. No. 62/054,389, filed on Sep. 24, 2014 by the present inventor. This application claims the benefit of provisional patent application Ser. No. 62/273,435, filed on Dec. 31, 2015 by the present inventor, the disclosure of which is hereby incorporated herein by reference in its entirety and for any and all purposes.

BACKGROUND

The present disclosure relates generally to control of building automation devices and more specifically to the use of mobile wireless device data and indoor mobile device location to controlling smart building devices.

Traditionally people control the power state and operation of many household electronic devices. For example people turn on and off lights, manually adjust the volume and number of active speakers in multi-room wireless speaker systems and manually control climate controls. Manual operation of some devices has recently been replaced by automatic operation. For example, learning automated thermostats endeavor to learn when a building is historically occupied and adapt operation accordingly. While inferring building occupancy is a challenge, an arguably more difficult challenge is to automate devices within the building (e.g. lights and smart TV's) based on the changing indoor location of users (e.g. room-transitions). For example, while a mobile wireless device location (e.g. indicated by smartphone on a home LAN) can be a somewhat reliable indicator of occupancy of a building, the exact indoor location of the mobile wireless device has sporadic accuracy at indicating person location (e.g. people leave devices unattended). Thus, dynamically determining the relevance of mobile device indoor location in systems to automate buildings remains a challenge.

SUMMARY

Traditional building-based occupant detection systems (e.g. motion sensors and door sensors) have limited capability to estimate precise occupant location, or the identity of a person (e.g. select an identity from among known family members). Correspondingly building-based occupancy detectors have limited success controlling output devices (e.g. lights) in a timely or personalized manner (e.g. the familiar problems of motion based lights turning off in a crowded room). Mobile wireless devices (e.g. smartphones and tablet PCs) are often associated with a primary user but have a wide range of accuracy for reporting a user's actual location, depending on usage patterns. The recent proliferation of short range (<400 meter) wireless messaging technologies (e.g. Bluetooth, WiFi and NFC) in consumer wireless devices has coincided with a growing number of sensors (e.g. temperature, light level, vibration, acceleration, sound) in these mobile wireless devices. Future smart buildings can benefit greatly from timely and accurate person location indications and hence the data fusion of fixed and mobile wireless devices is important.

According to the various embodiments of the present disclosure a central controller can receive first signals containing indications of aspects of a person from a plurality of fixed location short range wireless sensors and mobile device signals from one or more mobile wireless devices. The central controller can receive first signals containing data indicative of the occupancy of one or more regions of a building from a plurality of fixed wireless sensors associated with a building, can obtain mobile device signals from one or more mobile wireless devices, can weight a mobile device location estimate based on the estimated proximity of a person to the mobile wireless device and can transmit output signals to one or more output devices. Mobile device signals can contain a mobile device location indication and an indication of the proximity of the mobile wireless device to a person. An aspect of several embodiments is to provide means for weighing the relevance of mobile device location estimates in the process of estimating the occupancy of regions of a building and controlling aspects of output devices (e.g. lights, speakers, thermostats or appliances).

For example a central controller can receive first signals from a plurality of fixed wireless sensors (e.g. motion sensors, door sensors or sound sensors), wherein the first signals contain data indicative of the occupancy of one or more regions (e.g. rooms, hallways or stairwells) of the building. The central controller can also receive mobile device signals from a plurality of mobile wireless devices (e.g. smartphones, smartwatches or tablet PCs), wherein the mobile device signals contain data indicative of the location of the mobile devices and data indicative of the degree of proximity each device has to a person (e.g. orientation data indicating that a device is handheld or horizontal indicating placement on a flat surface). The central controller can aggregate and estimate mobile device proximities and locations and can generate weights for at least some of the mobile device location data based on the proximity estimates, thereby generating proximity-weighted mobile device location estimates. In an aspect of several embodiments the central controller can combine fixed sensor occupancy data with the proximity-weighted mobile device location estimates to generate an occupancy estimate for one or more regions of the building and in some embodiments estimate the identity of a person associated with occupancy data.

The proximity indication can identify circumstances when the central controller should apply a high weighting to a particular mobile device location estimate in the process of estimating the occupancy of a region of the building. In other embodiments a central controller can use the proximity indications in mobile device signals to generate weights for both the occupancy data from fixed wireless sensors and mobile device location indications. In another aspect of several embodiments the central controller can select one or more output output devices (e.g. wireless speakers, lights, displays) and transmit signals to the selected output devices based on the occupancy estimates.

In several embodiments this disclosure enables a central controller to rapidly transition between reliance on building-based sensor occupancy indications and mobile device location estimates, for the purpose of estimating the occupancy of one or more regions of the building and signaling automation devices.

The central controller can be located within the mobile wireless device. In this case the challenge for the controller is determining how to weight the relative importance of the mobile device location and fixed wireless sensors occupancy data to most accurately estimate occupancy. The disclosed system provides means for weighting the device and person location data, based in part on the proximity indication. For example the central controller could be located in a tablet PC, thereby enabling the tablet PC to play music on a dynamic subset of the wireless speakers located throughout a building. Speakers can be chosen based on the estimated location of the primary user. The subset of speakers could be chosen based on part on weighting person and tablet PC location estimates, whereby the weighting is based in part on the user proximity indication measured by the tablet PC.

Accordingly several advantages are that a user could start playing music on wireless speakers in one room, walk to another room and the music would follow the user to the other room. The system provides improved estimation of user location, by providing means to determine when mobile device data is relevant to the user location estimation calculation. For example, if a user began playing music from a tablet PC on wireless speakers and then put the tablet PC on a flat surface before going to the kitchen the system provides means to identify that the sound should follow the person and not remain clustered about the tablet PC. This would eliminate the potential problem of playing music on all the speakers at once.

In another example, a smartwatch can report location and proximity indications to a central controller (e.g. home router), whereby the proximity indications can be used to estimate that a person is wearing the smartwatch while walking. The disclosed central controller can apply a larger weighting to the smartwatch location data (e.g. relative to fixed occupancy sensors or an unattended smartphone).

Various embodiments of this invention have the potential to intelligently and efficiently control devices based on an occupancy estimate for one or more regions of a building and in some embodiments a corresponding identity estimate. Weighting the relative importance of mobile device location data based on an indication of proximity of the mobile device to a person can improve the accuracy of occupancy estimates, particularly in situations wherein fixed wireless sensors report weak indications of occupancy due to a lack of motion or sound. For example, in one embodiment a central control can identify that first signals indicate the motion of a person and mobile device signals contain a mobile device proximity indications (e.g. a horizontal device orientation), identify that the mobile device is not in motion (e.g. left on a table), and thereby enabling the weighting of the mobile device to be rapidly reduced in the process of determining room occupancy or person location.

In another embodiment of the present technology, identifying a person responsible for occupancy indications can greatly customize future location predictions and the selection of output devices. A central controller can contain or access one or more historical user profiles, each associated with a particular person who occupies the building. The central controller can generate one or more identity estimates based on occupancy indications in one or more regions of the building. The central controller can weight a common aspect of one or more historical user profiles, where the weights can be selected based on strength of each identity estimate. The central controller can select output devices based in part on a combination of identity-weighted historical profile aspects. New occupancy data or patterns of behavior can be assigned to a historical user profile if the identity of the person responsible for occupancy estimate can be determined with sufficient confidence. Each historical user profile can contain information on associated mobile devices and occupancy patterns, including their favorite locations, common paths traveled in the building and dwell times.

In another aspect of the present technology the historical user profile can contain a location correlation matrix. Each element of the location correlation matrix can indicate the probability that the presence of the person in a first region will correspond with occupancy indications in a second region at some time later. A central controller can estimate the identity of a person responsible for occupancy data transmitted from one or more fixed wireless sensors. The historical user profile corresponding to the estimated identity can be used as part of the process to select one or more output devices. In yet another aspect of the present technology the historical user profile corresponding to an estimated identity can be used to select output devices in anticipation of the future arrival of the person corresponding to the estimated identity. In yet another aspect of the present technology, a central controller can generate an occupancy estimate for one or more regions of a building, can then calculate multiple estimates for the identity of the person (e.g. a probability for each family member based on analysis of sensor data or mobile wireless device interactions). The system can weight a common aspect from multiple historical user profiles (e.g. favorite locations for each member of a family), whereby weights are based in part on the corresponding identity probability. The central controller can select one or more output devices, based in part on the identity-weighted aspects from a plurality of historical user profiles.

ADVANTAGES

The techniques described in this specification can be implemented to achieve the following exemplary advantages: Person location accuracy can be improved by rapidly identifying relevant mobile devices that are proximal to people.

Identities can be associated with occupancy data generated by home automation sensors (e.g. motion sensors), by correlating patterns of fixed wireless sensor data with mobile device locations, in particular when there is a strong proximity indication between a person and the mobile device. For example, motion in a home-office may sometimes be associated with strong person-to-device proximity indication at smartphone A but never with smartphone B. Subsequent fixed sensor data in the home-office can be associated with the primary user of smartphone A, thereby enabling the association of fixed sensor occupancy data with a person.

The disclosed system provides means to reduce false negative indications of room occupancy. This is a particular problem with motion activated lighting, wherein previous technologies often mistake periods of inactivity as an unoccupied region. For example, a central controller can receive weak occupancy indications from fixed motion sensors if a person is sitting quietly for a period of time. The disclosed central controller can estimate mobile device locations and determine person-to-device proximity and thereby keep the lights on during inactive periods.

Similarly, if a mobile device in another room experiences a rapid increase in person-to-device proximity, the disclosures provides means for this indication to act as confirmation that a person has left the original location and cause the lights to turn off, thereby saving energy and reducing latency and false negative events.

The disclosed central controller can reduce power consumption and network traffic. In one embodiment occupancy indications from fixed wireless sensors associated with a building can cause the central controller to instruct mobile wireless devices to transmit mobile device signals including location and person proximity indications. Similarly, frequent transmission of location data from mobile devices can cause significant power consumption. The disclosed controller can estimate the proximity of a person to a mobile device and thereby identify devices most indicative of the person's location. This approach improves power conservation by reducing transmission frequency from mobile nodes that have low person-to-device proximity. In some embodiments, a mobile device can use a large or rapid change in person-to-device proximity to initiate location transmission, thereby further conserving power.

The disclosed system can improve occupancy estimation for elder care. A plurality of fixed wireless sensors (e.g. motion) can monitor a person's mobility and occupancy. The mobile wireless device can be a home help pendant (e.g. Life Alert) and the proximity indication can be the fall detection technology. The disclosed system enables improved mobility and fall detection by weighing the pendant location data based in part on the wearer's proximity indication and the fixed sensor data. For example the pendant location can receive a low weighting if it indicates a stationary horizontal placement (e.g. placed on a nightstand) and fixed motion sensors indicate regular motion patterns elsewhere. Conversely, the central controller can apply a high weighting to the pendant location data if the proximity indications show stationary non-horizontal placement (e.g. a person lying on a floor) and fixed motion sensors indicate abnormal motion patterns.

In some embodiments appliances (e.g. refrigerators) with wireless capability (e.g. Bluetooth) can be fixed wireless sensors operable to indicate occupancy based on user activity (e.g. opening the refrigerator door). Such appliances can further indicate regular or irregular occupancy patterns for regions of a building.

In some embodiments the central controller can use the proximity indications in mobile device signals to enhance the accuracy of the mobile device location estimates. For example a mobile phone may transmit location data to a central controller and may also report proximity data in the form of device orientation measurements (e.g. pointing North with an elevation angle of 70 degrees above the horizon). The central controller can use the person proximity indications to improve mobile device location estimates by accounting for factors such as the placement of the person relative to the mobile device or the orientation of the transmitting antenna on the mobile device. In this case the weight generated for the mobile device location data can be in the form of a correction factor.

The disclosed central controller enables improved estimation of the number of occupants in a building and regions occupied in a building. For example, a system that accepts all reported mobile device locations can result in overestimating occupancy. Conversely, a system that estimating occupancy based on only those mobile devices that report direct user interaction (e.g. typing or touching a screen) can underestimate occupancy. Embodiments of the disclosed central controller can improve occupancy estimation by weighing mobile device locations based on a variety of close range and long range person proximity indications (e.g. hearing background voices, or sensing vibration from a person typing nearby), included in mobile device signals from mobile wireless devices.

The disclosed central controller enables fixed wireless sensor data to be associated with a specific mobile device user, by enabling correlation between fixed wireless sensor data and proximity-weighted mobile device locations. One use of this advantage is in subsequent situations where only fixed sensor data is available (e.g. no mobile devices are present), whereby the central controller can use a location model to add historical context, thereby enabling location and identity to be estimated based on times when mobile devices were present. For example when a person is in a room with no mobile devices, the system can estimate their location based in part on previous instances with similar fixed sensor readings, when a mobile device with estimated location, was reported as being in close proximity to the persons.

The system enables mapping of individual users occupancy patterns. This further enables the system to take user-specific actions such as delivering personalized music or news reports. For example a message delivered to the central controller can be routed to a home automation device (e.g. video screen) based on a reported smartphone location and an indication of strong proximity (e.g. the phone is at an angle indicating it is being carried).

Another advantage is that the central controller can improve reporting of a person's last known location (e.g. in emergency situations). The central controller can estimate and store person-to-device proximity estimates, thereby providing improved determination of the last known location of a person. For example, prior to an earthquake, the system could receive location and proximity indications from a plurality of personal electronic devices and identify that a person was proximal to their smartphone (e.g. snoring nearby) and not proximal to their tablet PC, or smartwatch. The system could also identify one or more mobile devices that are most indicative of proximity to a person prior to an event.

Accordingly, several additional advantages of the disclosed central controller with historical user profiles are as follows. One advantage is improved future location prediction and automation device selection. The disclosed system improved future location prediction by estimating the identity of the occupant. Previous building automation control systems do not differentiated between users when anticipating future location based on historical data. Building occupants have individual patterns while aggregate data across all occupants has less predictive power. By estimating the identity of an occupant the present technology provides means to group individual user patterns, thereby enabling improved future location prediction. For example if there are three bedrooms at the end of a hallway, prior central controllers could aggregate historical occupancy data for all users and estimate a substantially equal likelihood that someone walking down the hallway will enter one of the three rooms and activate output devices (e.g. lights) accordingly. The present technology estimates the person's identity. In cases where the identity estimates clearly points to one person the lights in the corresponding bedroom can be raised in advance of their arrival.

The disclosed system provides improved user experience through reduced latency. One of the challenges with building automation systems is the time delay between sensing a person and activating home automation devices (e.g. the time lag between entering a room and automated lighting activation). The disclosed technology reduces latency by anticipating a user's future location. In this way lights and music can dynamically adapt to the users future location and be ready before their arrival. The technology provides means to estimate a user's future location or behavior based on generating one or more estimates of their identity and weighting aspects of one or more historical user profiles. For example using the present system if a person in an office building walks down a hallway with several offices, the system could estimate their identity with 60% probability as being person #1 who works in office #1 and 40% probability that they are the person #2 who works in office #2. The system could access the respective historical user profiles, identify favorite destinations (e.g. office, or break room) associated with each identity estimate. The system could then, weight the favorite locations in accordance with the respective identity probability. The system could then light the path to offices #1 and #2. At some time later, additional sensor or occupancy data can confirm one of the identity estimates (e.g. person enters office #1) and lighting locations associated with low probability identity estimates can be dimmed.

In several embodiments the disclosed central controller enables improved real-time occupancy estimates for discrete regions of a building that can be provided as core functionality in a building operating system. Persons of skill in the art can develop applications that utilize the enhanced occupancy estimates to automate devices and realize a wide variety of improvements including energy savings, customized entertainment and safety.

DRAWINGS

DETAILED DESCRIPTION

Figure 1A:
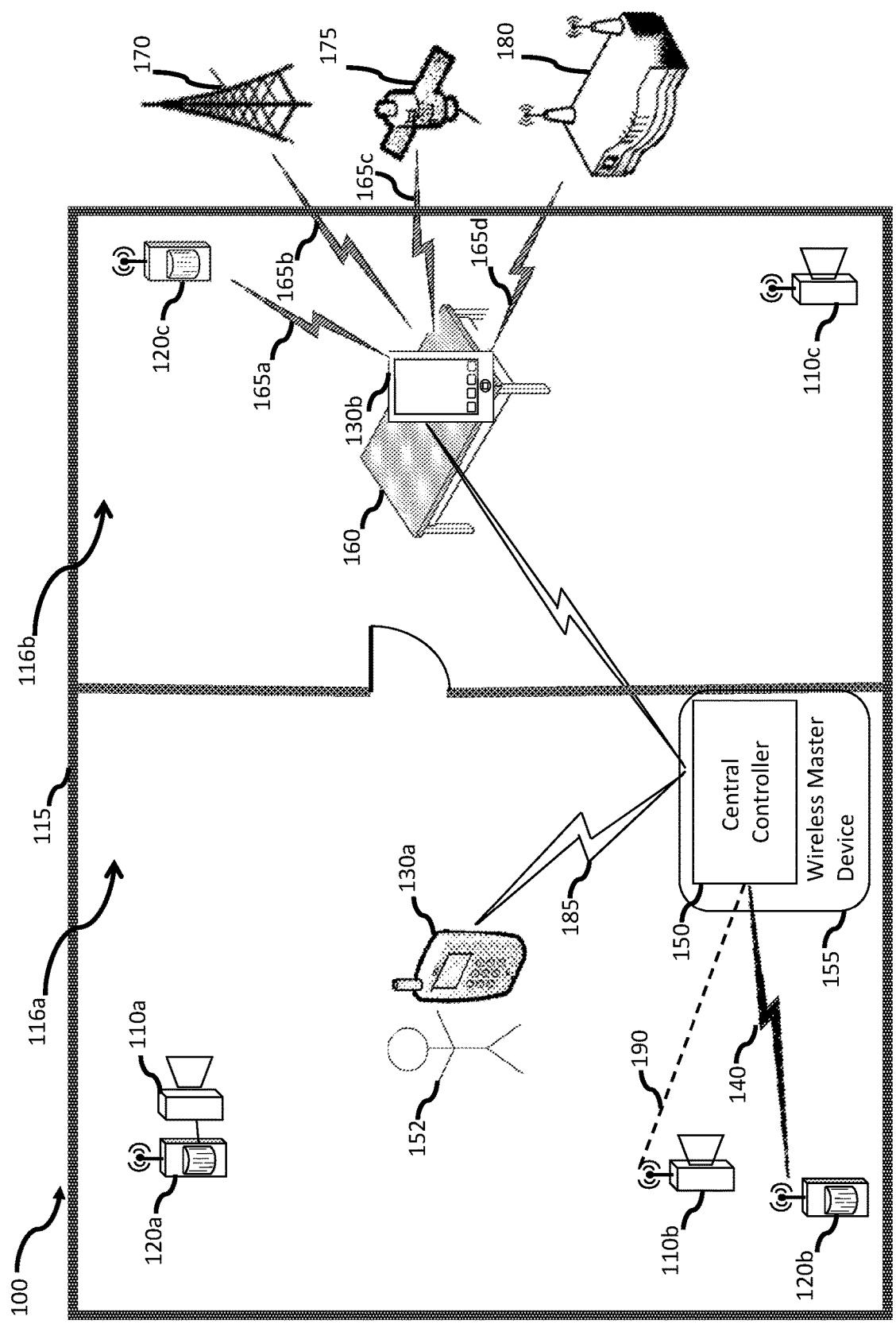
FIG. 1A and FIG. 1B are exemplary diagrams of an indoor area in which a central controller receives signals from mobile wireless devices and fixed wireless sensors, according to an embodiment of the present disclosure.
Figure 1B:
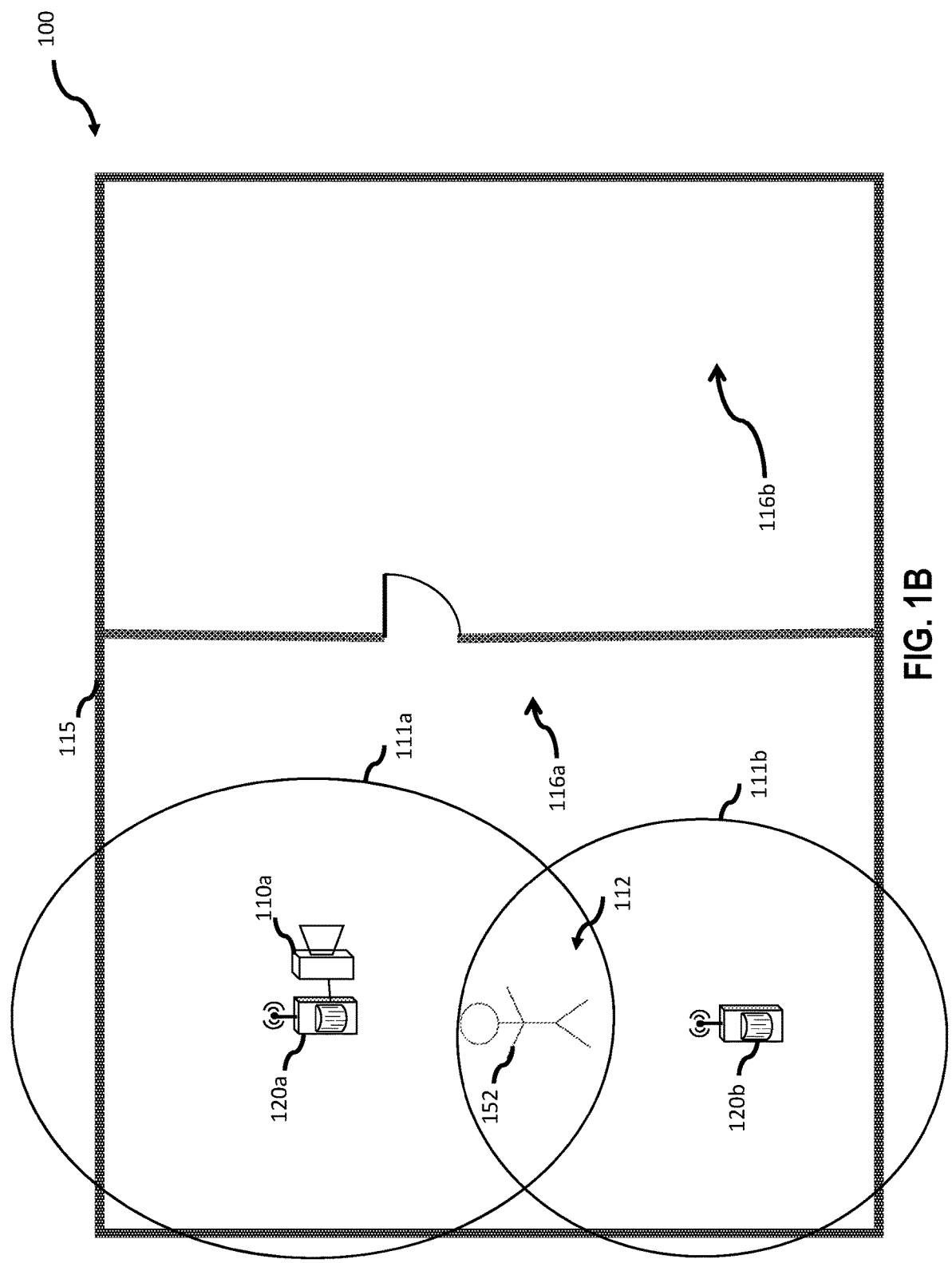

FIG. 1A illustrates a system 100, within a building 115, for dynamically controlling one or more automated electronic devices 110, according to one embodiment of the present disclosure. In the embodiment of FIG. 1 central controller 150 receives first wireless signals 140 from a plurality of fixed wireless sensors 120. Central controller 150 further receives mobile device signals 185 from two mobile wireless devices 130a and 130b. Mobile devices 130a and 130b can determine their respective locations based on wireless localization signals 165 from reference locations (e.g. a fixed wireless sensor 120c, a wireless access point 180, a GPS satellite 175 or a cellular network tower 170). In this embodiment mobile devices 130a and 130b can generate proximity data indicative of their respective proximities to a person 152. The proximity data can be based on direct user input (e.g. typing or touching the screen) or indirect user input (e.g. the sound of people talking in the background, temperature changes, elevation angle or vibration). Mobile wireless devices 130a and 130b can transmit location and proximity indications as second data in mobile device signals 185. In the embodiment of FIG. 1 central controller 150 weighs the mobile device location indications based in part on the proximity indications. Central controller 150 combines weighted mobile device location indications with occupancy data from first signals 140 and generates an occupancy estimate for two regions 116a and 116b of indoor area 115. In the embodiment of FIG. 1B the regions 116 are rooms within the building. The term "region" is used herein broadly to mean a portion of a building operable to be occupied by one or more people. Regions can be multiple rooms, portions of a room or a range of points on a Cartesian coordinate system (e.g. a region can be all points on an XYZ grid relative to some origin point wherein X is between 0 and 3, Y is between 0 and 10 and Z=1). Regions can be substantially non-overlapping as illustrated by regions circular regions 111a and 111b in FIG. 1B. In the context of this disclosure a region is considered "non-overlapping" when the region that does share more than 50% of it's occupiable area with another region. A region can be part of a set of regions that accounts for some or all of the occupiable space in the building. For example, a central controller can contain a set of 5 regions, established at the time of installation to correspond to 5 rooms that contain wireless occupancy sensors (e.g. a set of regions={ENTRYWAY, KITCHEN, BEDROOM, LIVING ROOM, BATHROOM}). In some embodiments, central controller 150 can maintain a current occupancy estimate for some or all regions in the set. In other embodiments system 100 can contain a single region that encompasses some or all of the building. For example, a central controller can be operable to automatically turn on a television when occupancy is sensed in a living-room.

Central controller 150 can dynamically select one or more output devices, for example 110a and 110b, based on the occupancy estimates and transmit output signals to selected output devices. Output devices 110 are operable to receive output signals 190 from a central controller and alter an aspect of their operation based in part on output signals. Output devices 110 can be building-based automation devices include lights, climate controllers, security systems, appliances and wireless garage doors. Output devices 110 can be building-based media distribution devices, speakers, music systems television tuners, wireless routers and digital video recorders. Output devices 110 can be mobile wireless devices including smartphones, music controllers, tablet PCs, smartwatches, autonomous vehicles, robots or drones. Output devices can also be computers or automobiles.

In some embodiments the proximity and location indications are not included as second data but instead can be aspects of the mobile device signal quality (e.g. received signals strength indication, bit error rate, signal-to-noise ratio or time of flight delay). For example a mobile device may report to a central controller that it is stationary, while the variations in the received signals strength indication (RSSI) of signals 185 received at the central controller 150 can indicate the presence of a person close to the mobile wireless device. In another example the mobile device location indication may be based on the received signal strength indication.

In some embodiments the mobile device location indication in mobile device signals may be based on receiving first signals 140 at a mobile wireless device. For example, the location indication in a mobile device signal can be RSSI measurements based on a plurality of first signals 140, received at both a mobile device and the central controller 150. The mobile device 130a or 130b can relay the received RSSI values to central controller 150 in mobile device signals. The central controller can compare RSSI values from first signals with those received as location indications in mobile device signals and thereby estimate the location of the mobile wireless device.

In yet other embodiments occupancy data from a plurality of fixed wireless sensors can be combined to the central controller 150 to generate an occupancy estimate in a smaller region. For example first data from fixed sensors 120a and 120b can indicate that person 152 simultaneously occupies a location within the circular regions 111a and 111b. Central controller 150 can estimate that a person 152 in occupying the overlapping region 112.

In some embodiments central controller 150 can be a standalone fixed location wireless device (e.g. a Wireless router, a wireless access point, a wireless repeater or a computer with wireless capability). In other embodiments the central automation controller 150 can be located inside a mobile wireless master device 155. Examples of a wireless device that could contain a central automation controller and embody the wireless master device 155 include a home entertainment controller (e.g. TV, lighting or audio controller), a mobile media server, a tablet PC, smartphone or smartwatch).

Fixed Wireless Sensors

Central controller 150 receives first wireless signals 140 from one or more fixed wireless sensors 120, associated with a building. Fixed wireless sensors 120 can sense occupancy in a region around the sensor (e.g. an omnidirectional region around the wireless sensor based on an effective operating range or a region in a directional field of view) and can have little or no specificity to or association with a person. The term "fixed wireless sensor" is used herein broadly to mean an electronic device or portion of a device with means of sensing one or more aspects of a person in a region of the building, including direct user interaction (e.g. pushing a button or moving a lever) and transmitting short range wireless signals containing occupancy data to a central controller 150. Fixed wireless sensors 120 can be attached to a building structure or have transitory placement within a building or on a building exterior (e.g. external security camera or motion detector).

Fixed wireless sensors 120 can have one or more sensors operable to sense an aspect of a person in the vicinity of the sensor. Examples include wireless home security sensors such as infrared motion detectors, magnetic proximity sensors, sound detectors, room entry and exit detectors, baby monitors, ultrasonic motion sensors and wireless security cameras. Other types of fixed wireless sensors 120 can report occupancy based on user interaction such as a button push or breaking an electrical contact, for example wireless window sensors, door sensors, door locks and a security system keypad.

A Fixed wireless sensor 120 can be part of a larger electronic appliance (e.g. a wirelessly enabled refrigerator, television, coffee maker, door lock or washing machine). Many manufacturers are now installing Bluetooth, Zigbee and WiFi transceivers in these appliances for the purpose of reporting occupancy based on direct or indirect user interaction. Another example of a fixed wireless sensor is the Amazon Echo speaker available from Amazon Inc. of Seattle Wash. The Echo speaker contains a plurality of microphones and can transmit short range Bluetooth and WiFi signals containing occupancy indications.

Figure 2:
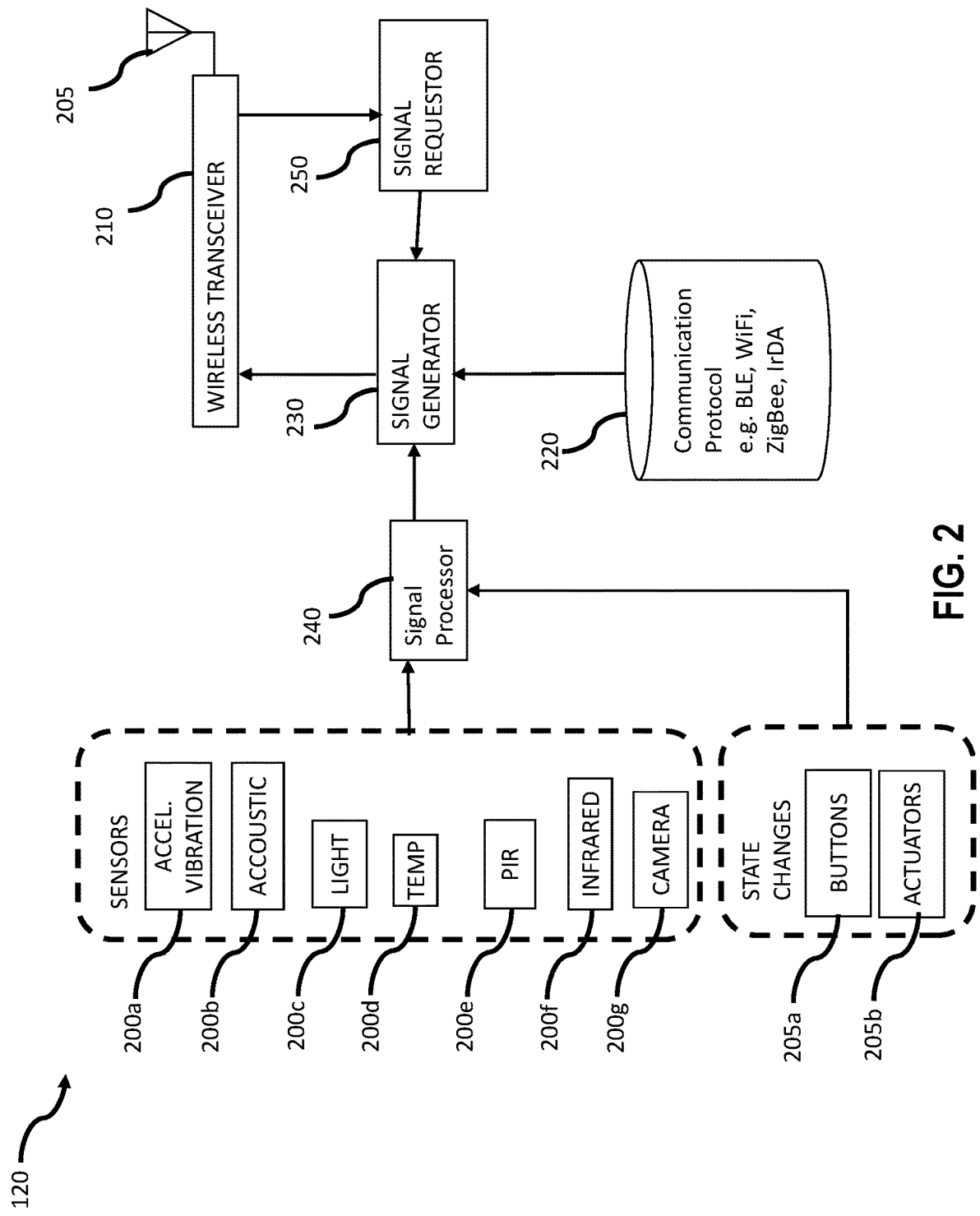
FIG. 2 illustrates an exemplary fixed wireless sensor in accordance with one embodiment of the present disclosure.

In some embodiments a wireless sensor 120 can be part of an automation device 110 with wireless control capability (e.g. wireless sensor node 120a is housed in a common electronics enclosure with a wireless automation device 110a). Automation device 110a can be operable to receive output signals 190 from central controller 150. The combination of the sensor and wireless automation device can share a transceiver and antenna for sending first signals 140, including status and state of the automation device 110a, and receiving output signals 190. FIG. 2 illustrates an exemplary fixed wireless sensor 120 in accordance with one embodiment of the present disclosure. Each fixed wireless sensor can contain one or more sensors 200a-g which can sense an aspect of a person. Sensors can include passive infrared (PIR) and active infrared sensors such as found in security systems as well as thermal, sound, light or vibration sensor. The sensor may also include a digital camera. Fixed wireless sensors can also sense state changes such as the operation of buttons 205a or actuators 205b (e.g. the lever indicating the refrigerator door has been opened). Fixed wireless sensors can contain a short-range wireless transceiver 210 and one or more antennas 205, operable to transmit first signals 140 to central controller 150.

First signals 140 can contain sensor measurements indicative of an aspect of a person (e.g. motion, thermal, sound, humidity or vibration associated with a person). In some embodiments a first signal 140 can include a unique identifier, used to identify a fixed wireless sensor 120 relative to other wireless sensors in the system.

Exemplary fixed wireless signals 140 include electrical, acoustic or optic signals. A short range wireless transceiver 210 is considered to have an operable transmission range less than 400 meters. Exemplary short range electrical protocols include Z-wave, Zigbee, Bluetooth, Low-Energy Bluetooth (BLE), WiFi, RFID. Examples of short range optical protocols include IEEE 802.15.7 and Infrared Data Association (IrDA). The wireless transceiver 210 and signals generator can be embodied as one or more microchips for example the CC3000 WiFi transceiver and application processor or CC2430 Bluetooth transceiver and application processor, both available from Texas Instruments of Santa Clara, Calif. The wireless transceiver 210 and signal generator 230 can perform one or more pairing operations operable to associate a fixed wireless sensor 120 with a specific central controller 150. Examples of pairing operations include, responding to an advertising signal from a central controller, negotiating or transmitting a unique ID for a fixed wireless sensor (e.g. session ID associated with short range wireless messages), establishing a secure connection by agreeing on a message cypher with a central controller, announcing to a central controller the capabilities of a fixed wireless sensor (e.g. motion, vibration, orientation, sound, humidity, state and number of buttons) or announcing capabilities such as data rate or the model number identifying the specific type of fixed wireless sensor. The pairing operation can associate a fixed wireless sensor 120 with a central controller 150.

Fixed wireless sensors 120 can contain a signal processor 240 coupled to sensor 200a-g, buttons 205a or actuators 205b, to perform various degrees of processing on the raw sensor data. The overall function of the processor can be to highlight sensor or actuator readings indicative of the presence of a person in a region around the sensor and generate first data. The processor can function to remove background sensor readings, detect peak values, filter the data or otherwise process the sensor data. For example, acoustic sensor readings may be filtered to remove background noise, or sounds known not to indicate the presence of a person such as the hum of refrigerator motor or the rustling of trees. The signal processor may thereby function to produce first data which has enhanced or highlighted indication of occupancy in a region around the fixed wireless sensor. The processor may combine data from multiple sensors or employ complex pattern recognition algorithms and output first data indicative of occupancy of a region around the fixed sensor. The signal generator 230 can combine sensor data and a unique identifier using the wireless protocol 220 to generate first signals 140. The unique identifier can serve to identify the fixed wireless sensor and identify first signals 140 as coming from a particular fixed wireless sensor 120. First signals 140 contain first data. Examples of first data include raw sensor values and values indicating occupancy probability (e.g. 0.9 or 90%). In some embodiments fixed wireless sensor 120 can segment the field of sensing into smaller regions and report occupancy data for each of these smaller regions. For example a wireless camera can transmit raw images, compressed images or images processed to identify occupancy in specific smaller regions as first data. The region for which a fixed wireless sensor is operable to report occupancy can be identified at the time of installation. For example, a security system can be setup such that specific wireless sensors cover specific regions of a house (e.g. front hallway, master bedroom or kitchen). These regions can identified to the central controller, thereby enabling first signals associated with a wireless sensor to be associated with a previously defined region (e.g. room, hallway, or portion of a room). In some embodiments fixed wireless sensors may not identify the region in which they are operable to sense occupancy and instead the central controller can define regions based on processing first signals. For example a central controller 150 can aggregate or process first data from a plurality of fixed wireless motion sensors 120 and identify relationships (e.g. correlated first data, sequential patterns, coincident first data or overlapping regions) and thereby identify regions associated with occupancy data from each fixed wireless sensor. Fixed wireless sensor 120 can include a signal requestor 250 operable to receive short range wireless signals from other fixed sensors or a central controller and initiate the transmission of a first signal 140.

Mobile Wireless Devices

FIG. 1A illustrates two mobile wireless devices 130a and 130b. Mobile wireless device 130a is embodied as a smartphone and 130b is embodied as a tablet PC. Embodiments of the disclosure may be implemented with a wide variety of mobile devices with short range wireless transmitters or transceivers. The mobile wireless device can be e.g. a mobile phone, a tablet PC, a laptop computer, a smartwatch, a wearable health monitor such as FitBit™, for FuelBand™ or a portable media player. The mobile wireless device may also be a wireless tag, whereby the primary purpose is to aid system 100 to locate a person 152 or a device attached to the tag.

The mobile devices 130a and 130b can be associated with a primary user. Examples of device-to-user association include a smartphone or a tablet PC assigned to an employee in an office, a smartwatch or health monitor primarily worn by one person or a portable laptop computer used by one family member. In some cases one person may be the primary user of a device at one time e.g. in the morning, while another person may be the primary user at another time e.g. at night.

Figure 3:
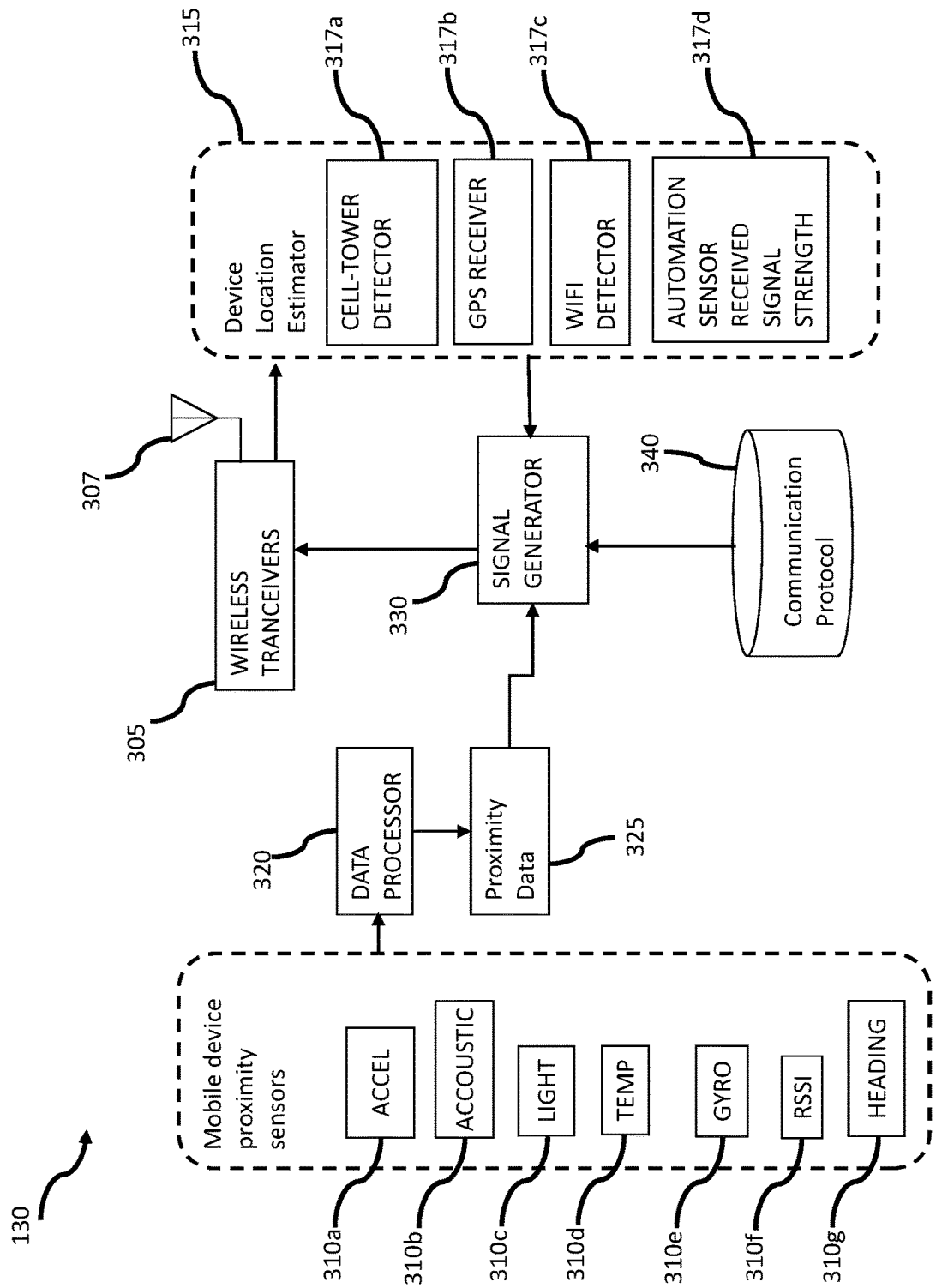
FIG. 3 illustrates an exemplary mobile wireless device in accordance with one embodiment of the present technology.

FIG. 3 illustrates an exemplary mobile wireless device in accordance with one embodiment of the present technology. The mobile device 130 can contain one or more wireless transceivers 305 operable to transmit mobile device signals 185 to central controller 150. Mobile wireless device 130 can also include one or more antennas 307. Antenna 307 can be a chip type antenna, a wire or can be printed on a printed circuit board.

Device Location Estimator

Mobile device 130 can include a device location estimator 315 that estimates a past or current location of mobile wireless device 130. Device location estimator can send data about the location of the mobile device to the signals generator 330. Device location estimator 315 can be implemented as one or more processors or one or more integrated circuited. Device location estimator 315 can be operable coupled to a variety of signals receivers operable to receive localization signals 165. Device location estimator 315 can perform various degrees of processing to estimate the mobile wireless device location. Localization signals 165 can be short range wireless signals (e.g. WiFi, Bluetooth, Zigbee) or long range wireless signals (e.g. GPS, 3G/4G cellular signals). Analysis of localization signals 165 can indicate external transmitters (e.g. cellular towers or WiFi hotspots) operable to provide the most accurate localization estimate. For example, the analysis can identify one or more Bluetooth beacons, fixed wireless sensors 120, automated electronic devices 110, cell towers 170, GPS satellites 175 or WiFi access points 180. Each external device can be associated with a known location, such that a location of the mobile device 130 can be estimated, e.g., via a triangulation or a trilateration technique.

Device location estimator 315 can process wireless signals received by the second data transceiver 305 or another receiver associated with the mobile device 130. For example, device location estimator can be operably coupled to a GPS receiver 317b that receives GPS signals identifying GPS satellites and can use received GPS signals to estimate mobile device location. In another example mobile device location estimator 315 can include a cell-tower detector 317a that detects which cell tower or cell towers are carrying cellular communications associated with mobile device 130. In another example, mobile device location estimator 315 can include a WiFi detector 317c that detects nearby WiFi transmitters. The transceiver 305 can be operable to receive first signals from the fixed wireless sensors 120. The mobile device location can be calculated based in part on an aspect of the first signal 140 e.g. received signal strength, time delay between sensing and receiving the signal or the bit error rate of the first signal 140. Device location estimator 315 can perform various degrees of computation including estimating distance from a mobile wireless device 130 to fixed wireless sensors 120, position triangulation and position trilateration. Device location estimator 315 can use output signals 190 or other signals from the central controller to estimate the location of the mobile device (e.g. within a range of 10 meters of the central controller) Device location estimator 315 can generate and transmit mobile device location data to a signal generator 330. Mobile device location data can be one or more aspects of localization signals 165, for example received signals strength, or the order of signals received (e.g. time of flight used by GPS systems). Mobile device location data can indicate the result of a calculation by device location estimator 315 indicating the estimated distance from the mobile device to one or more reference points (e.g. 10 meters from the central controller). A mobile devices or central controller can have a plurality of antennas operable to transmit independently or in combination (e.g. a MIMO antenna array). For example mobile device location data can be an indication of the antenna receiving a localization signal 165 or output signals 190 with greatest signals strength. Mobile device location data can include an indication of the direction of the mobile device relative to a reference location (e.g. location data can indicate the mobile device is southwest of the central controller).

Mobile device 130 can transmit mobile device signals 185 containing a mobile device location indication and a person-to-device proximity indication (e.g. proximity data 325). Proximity data 325 can be gathered from a wide variety of proximity sensors 310*a-g*, can be processed by a data processor 320 to further highlight proximity indications and can be integrated into mobile device signals 185 by signals generator 330.

The mobile phone 130*a* is shown proximal to the person 152. The mobile device 130*b* is not proximal to a person, such as a tablet PC that has been left on a table 160 in an unoccupied room for a period of time. Examples of proximity include devices attached to a person or placed close by a person, such as on a work desk, nightstand, kitchen counter, coffee table or car seat. Proximity can be indicated by the mobile device sensing acoustic signals, later determined to by typing, snoring or moving about a room. Further examples of proximity include being held during user-input, being carried in a person's hand, pocket, purse, backpack, or briefcase. In general, a mobile wireless device 130 can be considered to be proximal to a person when one or more sensors on the mobile device are able to sense the presence of the person. Proximity between a mobile wireless device and a person can also be indicated by variations in signal strength of signals 185 transmitted from a mobile device 130 to the central controller 150.

The proximity between a person and a mobile device can have a wide variety of values. For example a person engaged in direct user interaction with a mobile device (e.g. typing or touching a screen) can indicate direct proximity. Direct proximity can indicate that a person is within reach of the wireless device (e.g. 1 M). Other examples of direct proximity are vibrations indicative of walking with the mobile device in a pocket or purse, heartbeat measured by a mobile fitness tracker and small variations in the angle of inclination of a tablet PC indicating that a user is reading from the screen.

The mobile device 130 can also contain a wide variety of sensors 310*a-g* capable of sensing direct proximity as well as longer range indirect proximity (e.g. a tablet PC with a microphone that can hear a person talking in the background). For example mobile device sensors may include an accelerometer, microphone, gyroscope, magnetometer (digital compass), barometer, humidity sensor, altimeter or camera. Other examples include sensors capable of measuring temperature and light level in the vicinity of the device. The function of the sensors 310*a-g* is to provide data indicative of the state of the device and indicative of proximity of one or more people. Examples of data indicative of device state include, angular orientation of the mobile device relative to the ground, direction the device is pointing (e.g., 330 deg NW.), vibration, acceleration and power state (e.g. active, standby or sleep). Examples of data indicative of person proximity include sound measurements (e.g. hearing someone rustle a newspaper), vibration (e.g. associated with typing on a keyboard), acceleration (e.g. consistent with a person walking) or changes in received wireless signal quality (e.g. received signal strength indication (RSSI) or bit-error-rate). For example, changes in signal quality can be indicative of a person momentarily blocking or shadowing a transmitting source.

The mobile device 130 can contain a data processor 320 coupled to the sensors 310*a-g* to perform various degrees of processing on the raw sensor data. The function of the processor 320 can be to highlight important sensor data while reducing the total amount of sensor data transmitted by the device. The processor can function to remove background sensor readings, detect peak values, filter the data or otherwise process the sensor data. For example the acoustic sensor readings may be filtered to remove white noise, or sounds known not to indicate the proximity of a person such as the hum of refrigerator motor or the rustling of trees. The signal processor may thereby function to produce output data which has enhanced or highlighted indication of person to device proximity. The processor may combine data from multiple sensors and output an aggregated indication of person proximity. In one example processor 320 can be a digital signals processor operable to process a large number of sound samples (e.g. 44100 per second), remove high volume background noise (e.g. cars or machinery) and highlight indications of speech indicative of the proximity of a person.

The signal generator 330 functions to combine the proximity data 325 from the data processor 320 with location data from the location estimator 315. The signal generator can use a communication protocol 340 to form one or more mobile device signals 185 which are transmitted by the short range transceiver 305. In one embodiment the transmitter and receiver use the same short range wireless protocol. In other embodiments these could be different protocols. For example the wireless device may receive Bluetooth signals from nodes and transmit Wi-Fi signals including the mobile device location data and proximity data.

Central Controller

Figure 4A:
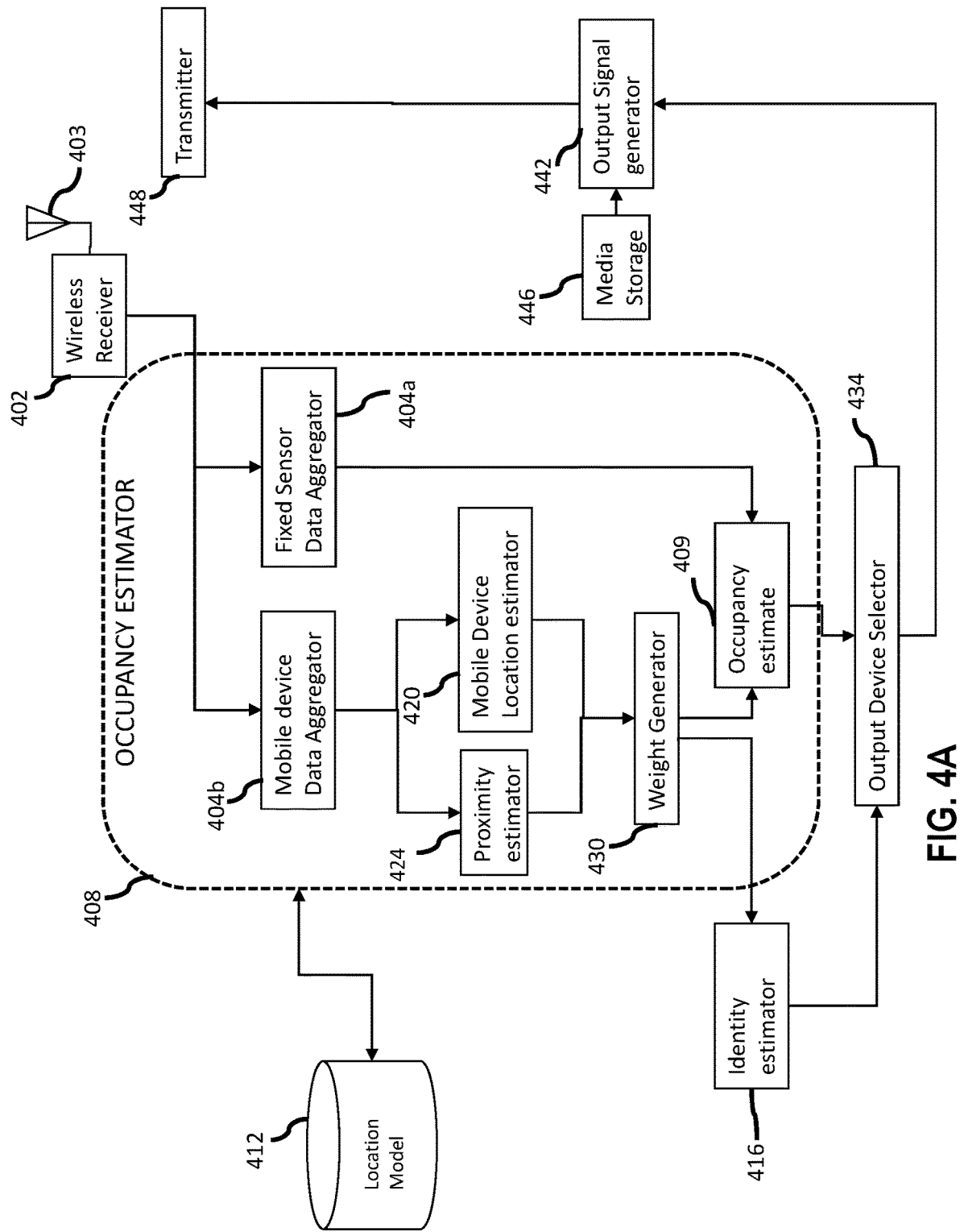
FIG. 4A, FIG. 4B, FIG. 4C and FIG. 4D are functional diagrams of exemplary central controllers according to several embodiments of the present disclosure.

FIG. 4A is a functional diagram of a central controller 150 in accordance with an embodiment of the present disclosure. Within the person location system 100, the overall function of the central controller 150 can be to select one or more automated electronic devices 110 to operate, based on fixed wireless sensors data indicative of a person's location, augmented with relevant mobile device locations. To accomplish this function the controller gathers signals from fixed wireless sensors and mobile devices, determines the relevance of mobile device location, based in part on the proximity of the device to a person (e.g. strong or weakly indicative of a person close by) and transmits signals to output devices based on an the estimated occupancy of one or more regions of the building. In other embodiments the proximity-based weightings are used to estimate the identity of a person responsible for at least some of the fixed wireless sensor data and can select aspects of output signals (e.g. the content or selected automation device) based in part on the identity estimate.

The central controller contains one or more receivers 402 and one or more antennas 403 operable to receive first signals 140 from fixed wireless sensors 120 and mobile device signals 185 from mobile devices 130. In some embodiments receiver 402 is part of a transceiver that is also capable of transmitting signals. Receiver 402 can include suitable hardware for performing device discovery, connection establishment, and communication necessary to receive first signals 140 and mobile device signals 185. Receiver 402 can be configured to operate with a variety of short range wireless transmission protocols e.g. Z-wave, Zigbee, Bluetooth, Low-Energy Bluetooth (BLE), WiFi, RFID and IrDA. Exemplary wireless signals include electrical, acoustic or optic signals. It should also be understood that several other short-range receivers can be used that do not utilize any standardized wireless protocols (e.g., car keyfobs). Receiver 402 can be a single microchip transceiver operable to receive signals, demodulate signals, identify data packets and transmit some or all of the data in a packet to other components (e.g. processors, memory devices) within the central controller, using a transmission protocol e.g. (I2C, UART, Ethernet or I2S). First signals 140 and mobile device signals 185 can be received using different receivers and different short range transmission protocols for example first signals can be Z-wave packets and mobile device signals can be low energy Bluetooth packets. Receiver 402 is also operable to measure one or more quality aspects of the received signals (e.g. RSSI, signal to noise ratio, time of flight and bit error rate), convert these indications to signal quality data and transmit these to other components within the central controller 150 along with packet contents.

Central controller 150 contains an occupancy estimator 408, operable to generate an occupancy estimate for one or more regions of the building. In FIG. 4A occupancy estimator 408 contains two data aggregators 404a and 404b operable to aggregate first and mobile device signals. Fixed sensor data aggregator 404a can gather occupancy indications (e.g. occupancy data or first signals quality indications) from first signals. Mobile device data aggregator 404b can gather mobile device location indications (e.g. location data or mobile device signals quality indications) and gather proximity indications (e.g. proximity data or mobile device signal quality indications) from mobile device signals. Each aggregator can track indicators such as the maximum value of data from a sensor over a particular time window (e.g. peak signal within the previous minute). Data from multiple sensors from a single fixed wireless sensor can be combined (e.g. combining PIR and sound data to verify the presence of a person or to estimate the distance of a person from the sensor) The function of the aggregator can be to provide sufficient data and highlight important data for subsequent processing steps. For example, in one embodiment, aggregated first data from 404a can be inspected for indication of activity, occupancy or large changes in occupancy sensed by fixed wireless sensors 120. Central controller 150 can apply an activity criterion to the aggregated first data. Central controller 150 can assess the activity criterion and identify strong activity and occupancy signals. In response occupancy signals or changes (e.g. satisfying an activity criterion) central controller 150 can transmit advertising signals, operable to request mobile wireless devices to respond with mobile device signals. Aspects of the advertising signal can be selected to reach some or all available mobile wireless devices (e.g. selecting the BLE advertising channels #37, 38 and 39). In this way central controller can avoid requesting mobile device signals until activity is sensed at fixed wireless sensors 120.

The occupancy estimator 408 can contain a mobile device location estimator 420, operable to determine an estimate of a mobile device location. Mobile device location estimator 420 can receive aggregated mobile device location data from aggregator 404a. Mobile device location estimator 420 can combine and refine the mobile device location data, received in mobile device signals and perform various degrees of processing to estimate the mobile device location. Mobile device location estimator 420 can use knowledge of network layout and placement of signal sources (e.g. routers, fixed wireless sensors, cell towers) to estimate the mobile device location, based on data contained in mobile device signals 185. In some embodiments mobile device location estimator utilizes a historical location model 412. The historical location model can be populated or trained with the floorplan of the building. The location model can indicate all occupiable regions in the building.

In one aspect of several embodiments the mobile device location estimator can estimate locations for mobile devices that are not proximal to people and thereby rule out these device location estimates in the process of calculating an occupancy estimate for the building. The output from the mobile device location estimator 420 can be a region of a building (e.g. the kitchen, a bedroom or a hallway), a portion of a room (e.g. the left side of a home office) or distance relative to the central controller or other reference point (e.g. located within 10 meters of the central controller) a location on a Cartesian coordinate grid or similar coordinate system.

In one aspect the mobile device location estimator can determine the region 116 of the building corresponding to a mobile device location estimate and identify this region as a mobile device location region. For example central controller 150 can receive mobile device signals from two mobile wireless devices, and estimate the device locations at 420. Mobile device location estimator can further determine that the locations fall within two regions (e.g. kitchen and bedroom) and can identify the kitchen and bedroom as mobile device location regions. In comparison, previous building automation controllers typically lack the spatial accuracy to assign a mobile wireless device to a region of the building.

Central controller 150 can contain a location model 412. Mobile device location estimator 420 can receive data from and conversely add data to the location model 412 for the building. The location model 412 can be stored remotely from other components of the central controller. In some embodiments the location model can be stored on a remote server, along with many other location models and accessed by the central controller 150 over a computer data network (e.g. World Wide Web, Ethernet or LAN). The location model 412 can contain historical location data for one, some or all people who have occupied a building as well as correlation data relating sensor values and estimated locations. The model can contain confidence data about previous occupancy estimates. For example a region in which occupancy that has been confirmed by several fixed and mobile sensors can be assigned a high confidence value. The location model can contain a map of all possible regions in a house, based on overlapping historical locations for all occupants. In other embodiments, the model can be based on data from other similar buildings (e.g. houses with a similar floor plan). In situations where the identity of a person can be determined, the model can associate historical occupancy estimates with a person.

In one example of estimating mobile device location using a location model 412; a mobile wireless device 130 (e.g. a smartphone) can measure the signals strength (RSSI)

of first signals 140 transmitted by a Bluetooth enabled refrigerator. The smartphone can record and transmit the RSSI values as mobile device location data in mobile device signals 185. The central controller can have previously identified the location of the refrigerator as being in the kitchen of the building and identify first signals 140 from the refrigerator, based on a unique identifier in the Bluetooth signals. The central controller 150 can aggregate and store the signal strength of first signals (refrigerator) as reported by the smartphone 130*a* to the central controller 150 and add these historical values to location model 412. Over time the central controller and location model 412 can identify the peak RSSI typically reported by a smartphone and estimate that the smartphone is located in the kitchen (e.g. the known location of the Bluetooth signals transmitter) during those times. In general the mobile device location estimator 420 can compare aggregated RSSI values in mobile device signals 185 with historical values in a location model 412 in the process of estimating the location of the smartphone. The model may also function to improve predictive capability in situations where, mobile devices are either not available or all mobile devices have low or zero proximity to people. In this case, the first data from fixed wireless sensors and the location model 412 can provide a more accurate occupancy estimate. For example if one or more fixed wireless sensors estimate that a person is in the general region of the kitchen, their location can be further refined by searching for previous instances with similar fixed wireless sensor data patterns from the location model 412. In this case high-confidence previous locations can include situations where mobile device locations with high person proximity weightings were available.

The occupancy estimator 408 can contain a proximity estimator 424, operable to receive aggregated proximity indications from mobile device signals 185 or from mobile device data aggregator 405. In FIG. 4D the central controller 150 is located inside a wireless mobile master device and proximity estimator 424 can receive proximity data from sensors 423*a-g* by direct electrical signal transfer (e.g. I2C, SPI, UART) without the need for second wireless signals. The proximity estimator 424 determines an estimate of the proximity between one or more people 152 and one or more mobile devices 130. The proximity estimator 424 can calculate an aggregate person proximity estimate for each mobile wireless device, based on aggregated sensor data across time. For example, the combined acoustic measurements across the last 10 samples from a smartphone may indicate that someone is typing on a keyboard close by. Data from multiple sensors, multiple mobile devices and multiple times may be combined. The proximity estimator can prioritize recent samples, for example a device that has recently been put on a flat surface may indicate a diminishing correlation between the device location and the person location and therefore a rapid decrease in proximity. In some embodiments first data from fixed wireless sensors can be used to enhance person-to-device proximity estimates. For example, a person can put a smartphone on a flat surface, indicating that direct proximity has ceased. The process of estimating the proximity of the person to the smartphone in the following minutes can be based in part on fixed sensor (e.g. motion) data indicating movement of the person. If fixed sensor data indicates no occupancy change (e.g. a person leaving the room) the proximity estimate can slowly decay as the smartphone sits unattended. Alternatively, motion indications from fixed wireless sensors concurrent with mobile device signals 185 reporting horizontal placement of the smartphone can cause the proximity estimate to rapidly decrease. Some of the proximity data in mobile device signals 185 may be a flag operable to indicate direct proximity of a person, thereby reducing or eliminating the processing required by the proximity estimator 424.

Proximity estimator 424 can include a digital signals processor (DSP) capable of identifying sounds associated with person proximity (e.g. typing, snoring, conversing) and sounds that are not necessarily associated with a person (e.g. a refrigerator motor, birds chirping). In some embodiments the proximity estimator can compare proximity indications (e.g. sound and vibration data) with a database of identified patterns in order to estimate proximity. For example a smartphone can report sound data to a central controller 150 and the proximity estimator 424 can access a remote server (e.g. on the World Wide Web) to compare sound samples with a database of audio tracks from popular television channels. In this way the proximity estimator can identify a person changing television channels, proximal to the smartphone. In some embodiments the proximity based on pattern matching can be performed locally using a computer process (e.g. DSP). In other embodiments proximity estimator 424 can submit proximity data for remote identification by a processor connected over a data network (e.g. World Wide Web, Ethernet or LAN). The one or more proximity estimates from estimator 424 can be in the form of a digital value within a range of values (e.g. a scale of 1-10), can be unique to each mobile device and can be aggregated across all mobile devices that occupy a common region (e.g. a kitchen). The proximity estimator can use knowledge of the brand and model of a mobile wireless device 120 to identify a transfer function relating proximity data to a proximity estimate. For example, knowledge of the capabilities of a large number of mobile devices can be stored in a database and indicate the vibration sensitivity or data format associated with the accelerometer or other state sensor in a particular model of mobile wireless device.

Central controller 150 can identify a proximity criterion for mobile devices. Central controller 150 can assess a proximity criterion identify mobile devices 130 that satisfy the proximity criterion. Mobile devices that pass the proximity criterion can be used in the weighing process. In another embodiment, if the proximity criterion is satisfied, the central controller can add useful data to the location model 412. For example it is ill-advised to attempt to correlate all mobile device locations with fixed wireless sensor occupancy indications, since a mobile device may be left unattended. However, if the proximity criterion is satisfied, the central control can add an aspect of the relationship between occupancy indication in first signals and the estimated mobile device location. Examples of proximity criterion include: mobile devices where mobile device signals indicate a strong proximity flag, a score of 5 or more out of 10 or an indication of direct proximity at any time in the last 30 seconds. The proximity criterion can be assessed based on aggregated proximity data from 404*a*.

In FIG. 4A occupancy estimator 408 contains a weight generator 430, operable to determine proximity-based weights for some or all of the mobile device location estimates. In one aspect of several embodiments weights can be based on estimates from the person proximity estimator 424. A mobile device with a low person proximity indication could receive a low weighting. Device location estimate may receive high weighting if there is an indication of strong proximity between a person and a mobile wireless device. A weight can be a numeric value or a function. For example, a weight for a particular mobile device location is equal to a factor (e.g. 4) multiplied by a detected proximity estimate or various numeric values associated with qualitative proximity levels. Examples of weights assigned to various proximity levels can include: proximal=1, not proximal=0; a person in the distant background=0.1; indirect proximity indicative of a person likely in the same room=0.5; direct proximity with the mobile device with or without direct user input=1.0. Weights can be determined based on recent proximity estimates. The weight generator can account for the plausibility of weighting based on recent data. For example, based on historical patterns the weight generator can determine a person checks their smartphone periodically during advertising breaks in a television show at a certain time each day. This information can be stored in the location model 412 or similar historical pattern storage (e.g. historical user model 455). Weights for the smartphone data can remain high for short periods of low direct proximity (e.g. flat placement on a coffee table) during the time associated with regular periodic proximity. Proximity can be estimated based on a database of proximity data for similar devices (e.g. a similar model smartphone or tablet PC) accessed on a remote server. This approach could be particularly useful for identifying the antenna gain of particular mobile wireless devices and thereby improving both proximity and mobile device location estimates.

Figure 4B:
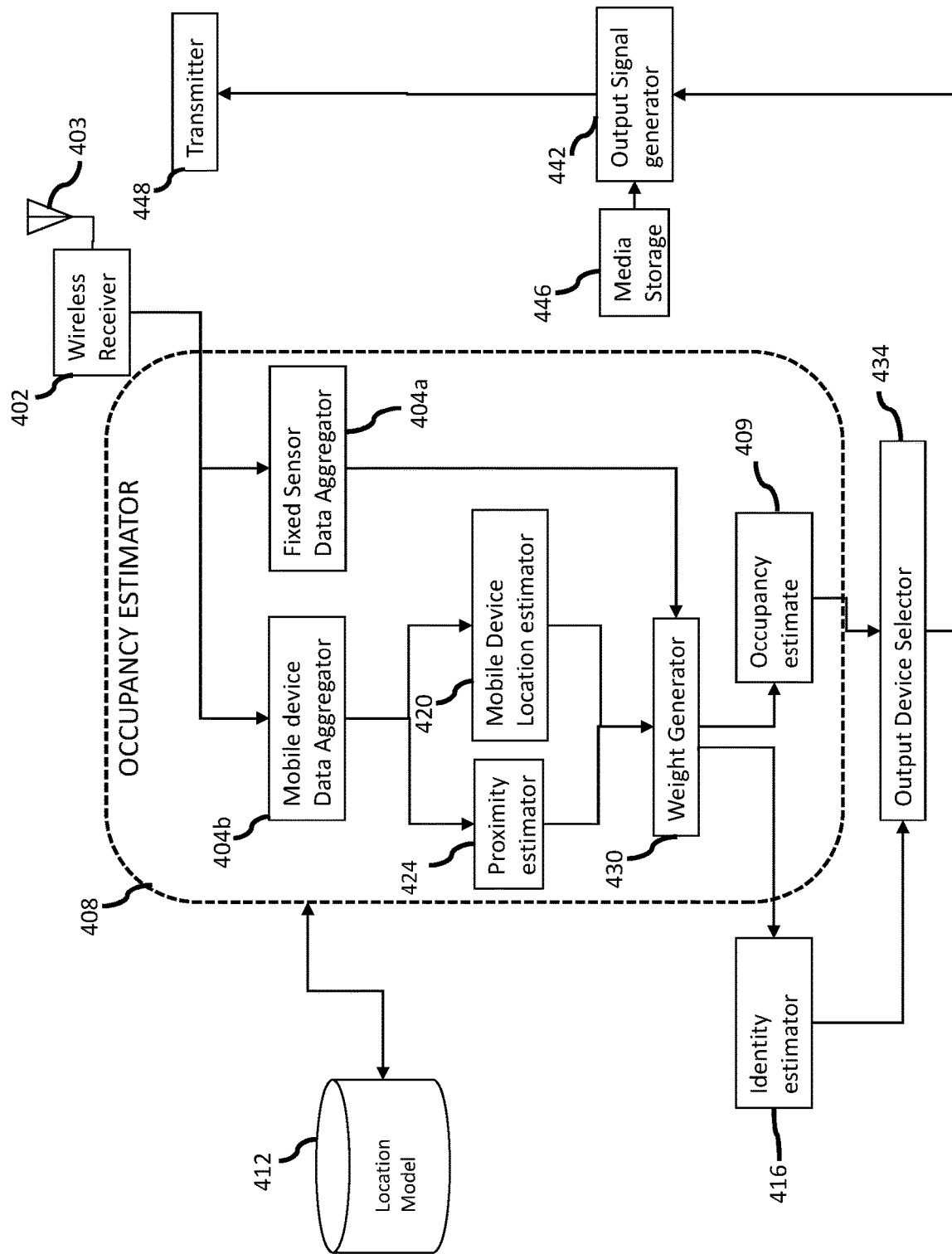

In FIG. 4B weight generator 430 combines aggregated first data from 404a and proximity estimates from 424 to generate weights for mobile device locations. In some embodiments aggregated fixed sensor occupancy data can be used to normalize the mobile device location estimates. For example during periods with strong clear occupancy indication form building based sensors (e.g. a person entering a room and walking past a wireless motion sensor), weights for mobile device locations can be uniforms attenuated (e.g. divided by 2). Conversely during periods of weak occupancy signals (e.g. during periods when a person is sleeping or sitting quietly) proximity weights can be uniformly amplifier. Thus proximity estimates can produce larger weights, relative to the weaker occupancy signals from fixed wireless sensors 120. In some embodiments, weights can be generated for both mobile device location estimates and aggregated occupancy data in first signals, thereby allowing for highlighting of the most relevant data. Weight generator 430 can use proximity estimates in conjunction with learned rules. The rules can be based on a database of transfer functions indicating how particular proximity signals correlate to the range of a person for a particular brands or models of mobile wireless devices. Weights can be based on the highest proximity estimate for a mobile wireless device in a particular period of time.

Occupancy estimator 408 produces one or more occupancy estimated for one or more regions of a building. In FIG. 4A the occupancy estimate 409 can be based on occupancy data from the fixed sensor data aggregator 404a and proximity-weighted mobile device location data from weight generator 430. Proximity estimator 408 can combine these two types of occupancy and location estimated in a variety of manners, including combinatorial or based on the highest overall indication of proximity in a region. The occupancy estimate 409 can be in the form of a probability of occupancy for an array of locations (e.g. X,Y grid), for example 0.1 at (X=1,Y=1), 0.0 at (X=1,Y=2), 0.2 at (X=2, Y=1) and 0.7 at (X=2,Y=2). The occupancy estimate can be the region with the highest probability of occupancy. The occupancy estimate can be the total estimated number of people in region, for example the occupancy estimate for a kitchen can be 3. The occupancy estimate for a plurality of regions can be chosen to account for an estimated total number of occupants in the plurality of regions. For example a one bedroom apartment with two occupants could have the following occupancy estimates: kitchen=0.5, bedroom=0.1, bathroom=0.0 and living room=1.4. The occupancy estimate can be binary for example a region can be "OCCUPIED" or "UNOCCUPIED" or in computer logic terms OCCUPIED=1 and UNOCCUPIED=0. An occupancy estimate of 1 or OCCUPIED can be assigned to a region in which the probability or aggregated indications of occupancy is greater than a threshold (e.g. probability greater than 50%). By combining occupancy indications from multiple fixed wireless devices together with proximity-weighted mobile device locations the occupancy estimator can significantly narrow the size of a particular region in which occupancy has a high probability. For example a motion sensor may report that the general area of the kitchen is occupied, while a Bluetooth enabled refrigerator may be able to report that the refrigerator door has just opened and hence the region of occupancy is in front of the refrigerator. A smartphone in the person's pocket can further report a strong proximity to the person and the central controller can further narrow the region of occupancy.

The occupancy estimator 408 can estimate the number of people in a region based on the a combination of fixed and mobile device data indicating multiple occupied regions of the building or occupancy that transitions form one region to a region that is already occupied. In one embodiment of FIG. 4B the occupancy estimate is based on based on generating proximity-based weights for first data indicating occupancy by fixed sensors and mobile device locations. In another embodiment of FIG. 4B the proximity estimates from 404b and aggregated fixed sensor occupancy data from 404a are used to weigh only the mobile device location estimates from location estimator 420.

The central controller 150 can contain an occupant identity estimator 416, operable to generate one or more identity estimates for a person responsible for the occupancy estimate in one or more regions of the building. The identity estimator 416 can provide identity estimates to the output device selector 434 and can provide identity estimates to a historical profile weigher 470. The identity estimate can be based on past sensor readings indicating locations commonly occupied by a particular person, activity on a wireless device (e.g. smartphone, tablet PC) associated with a particular person or voice recognition. The identity estimator 416 can receive weights, mobile device location estimates and fixed sensor occupancy data (first data) and estimate the identity of a person associated with some or all of the data. In some embodiments identity estimator 416 can associated some of the aggregated fixed sensor data with an identity based on coincident mobile device locations. In some embodiments an identity estimate 416 can be used to select media content, data or device settings for automation devices 110, based on a user's preferences. In one embodiment the identity estimate can be based on determining that aggregated first data from fixed wireless sensors has strong correlation to data in a historical user profile (e.g. favorite locations 458, and patterns of occupancy 459).

In other embodiments, identity estimator 416 can generate multiple estimates for the identity of a person corresponding to an occupancy estimate in a region. The one or more identity estimates can be a probability associated with each candidate identity. Identity estimator 416 can be a processor operating with an adaptive algorithm, operating on a variety of data streams including first data, mobile device location data, proximity data and occupancy estimates. Identity estimator 416 can be a neural network processor whereby multiple inputs (e.g. time of day, first data, and historical user profile data) are combined with adaptive weightings to produce one or more identity estimates associated with an occupancy estimate 409. For example, aggregated first data from fixed wireless sensors 120 can indicate occupancy in a home office that is historically only occupied by person A. In response to this occupancy estimate, identity estimator 416 can generate a high identity estimate for identity A (e.g. probability=90% for identity A or A=0.9). In some cases the identity estimator 416 can receive a signal indicating that devices associated with a particular identity are active elsewhere (e.g. in another building), and can generate a low (e.g. 0.1 or 0) probability estimate corresponding to a particular identity. In some cases identity estimator 416 can use previous data that is highly indicative of a particular identity to indicate present identity of the occupant (e.g. if there is only one occupant in a building and that occupant has been associated with recent high identity estimates for person A then subsequent occupancy estimates can inherit the high identity estimate for person A, based on the single occupant fact. Interaction with personal wireless devices (e.g. a smartphone) can provide a persistent indication of identity to the identity estimator 416.

Examples of identity estimates are: 90% probability of being person A, the person identified as the primary user of a mobile wireless device or an identity probability for each of the members of a family. For example a house can have three occupants, identified within the central controller as "FATHER", "MOTHER" and "CHILD". Example identity estimates, in response to occupancy indications are {0.1 FATHER, 0.8 MOTHER, and 0.1 CHILD}. In another example the central controller can report an occupancy estimate of 2 in a region (e.g. kitchen), indicating two people in the region. Identity estimates can be chosen such that sum of identity estimates is equal to the occupancy estimate (e.g. 0.9 FATHER, 0.9 MOTHER and 0.2 CHILD).

The central controller 150 contains a output device selector 434, operable to select one or more output devices 110, based in part on one or more occupancy estimates 409 for one or more regions of the building. Output device selector 434 can select one or more electronic devices 110 based on factors such as the geographic location relative to the region with highest proximity-weighted occupancy estimate 409. The output devices 110 can also be selected to provide a particular response at the estimated region of occupancy (e.g. a constant light level at the user location as they move throughout a building or a constant sound volume at the estimate room occupied). The output device selector 434 may use a model to anticipate the effect on a user of operating one or more output devices 110, based on the estimated occupied region. For example a wireless speaker may receive a signal to decrease volume if an occupancy estimate indicates a person in a region directly in front of a speaker. In another example, output device selector 434 can select a light at the end of a hallway as a output device and can signal the light to illuminate at a higher intensity if the person is far away (e.g. greater than 10 ft) to provide sufficient light intensity at a region associated with a high occupancy estimate 409.

Central controller 150 can contain a output signal generator 442 operable to generate output signals 190. Output signals can be based on the occupancy estimate for one or more regions of the building. Output signals 190 can include commands addressed to one or more output devices 110. In some embodiments output data identifies output devices selected by the output device selector 434. In this way, many devices can receive the output signals and output data can identify if the data is intended for use by a particular device. Output data can include commands or setting changes (e.g. turn on, turn off, change volume or light intensity) and output data can be based on part on the estimated occupancy of one or more regions.

The output signal generator 442 to generate one or more output signals 190 based on the occupancy estimate for one or more regions of the building in a wide variety of manners. For example the output signals generator can address output signals to all output devices in a region that indicates a particular occupancy estimate (e.g. turn on all lights in a region that exhibits an occupancy estimate greater than 0.9). In another example a output signals generator could generate a output signal addressed to a parent's mobile phone when an occupancy estimate in in accordance with this disclosure is generated in the hallway of a house, indicating that children have arrived home. The output signal generator 442 can choose between several reformed output signals using an occupancy estimate as the basis. The output signal generator can insert data into the output signal using the occupancy estimate as basis; examples include a particular device ID, wireless session ID, neighboring region, first data, second data, occupancy estimate or identity estimate. For example in response to an occupancy estimate in a region the output signal generator can include in output signals or output data, one or more identity estimates corresponding to the occupancy estimate. In another example output signal generator 442 makes choice regarding the content of output signals based on an occupancy estimate and that content selection can persist for some time afterwards. For example, in response to an occupancy signal in a region, output signals generator can select one or more wireless speakers, select or negotiate a session ID with the wireless speakers and continue to transmit output signals to the wireless speakers for hours or days afterwards. In other examples aspects of output signals are generated in part or indirectly as a result of occupancy estimates in a region of the building. The disclosed system enables a wide variety of conditions, computer logic or "if-this-then-that" IFTTT automation software, to determine how output signals 190 are based on occupancy estimates for regions of the building.

Output signal generator 442 can combine commands with media from a media storage device 446 to produce wireless signals. Examples of media storage include flash memory, CD-ROM, hard-disk media and RAM. Commands can instruct devices to perform one or more specific actions on a media signal, for example to attenuate, filter or delay a music stream. In this way the central controller 150 can output a broadcast streaming media signal (wireless audio, TV or video) with specific instructions for electronic devices to tailor the media signal for a desired effect in an occupied region. For example several speakers could receive a broadcast digital music stream (e.g. MP3, WMA or PCM) and each speaker could receive a command including a volume and delay (e.g. 20 milliseconds) such that sound from several speakers would reach a user's estimated location simultaneously. Signals from the signal generator 442 can be transmitted by the transmitter 402.

Central controller 150 can contain one or more transmitters 448 operable to send one or more output signals 190 to one or more output devices 110. Transmitter 448 can be a wireless transmitter (e.g. WiFi, 4G, Bluetooth, Zigbee, Z-wave) or transmitter 448 can transmit output signals 190 over a wired interface to automation devices. Examples of wired transmission protocols include Ethernet, Ethernet over powerline, Homeplug AV, USB. Transmitter 448 can use a variety of wired and wireless protocols to distribute audio or video streams to speakers and displays located throughout the building. Transmitter 448 can be indirectly coupled to output devices 110 using a data transmission network. For example, output signal generator 442 can generate web traffic such as Transmission Control Protocol/Internet Protocol (TCP/IP) or User Datagram Protocol (UDP) packets intended for a output device 110 and transmit these packets to a server on the world wide web. The server can be operably coupled to the output device and can subsequently transmit the packet to the output device. This type of server-relayed output device signaling has advantages in terms of signal reliability and storing copies of output signals.

Historical User Profile

Figure 4C:
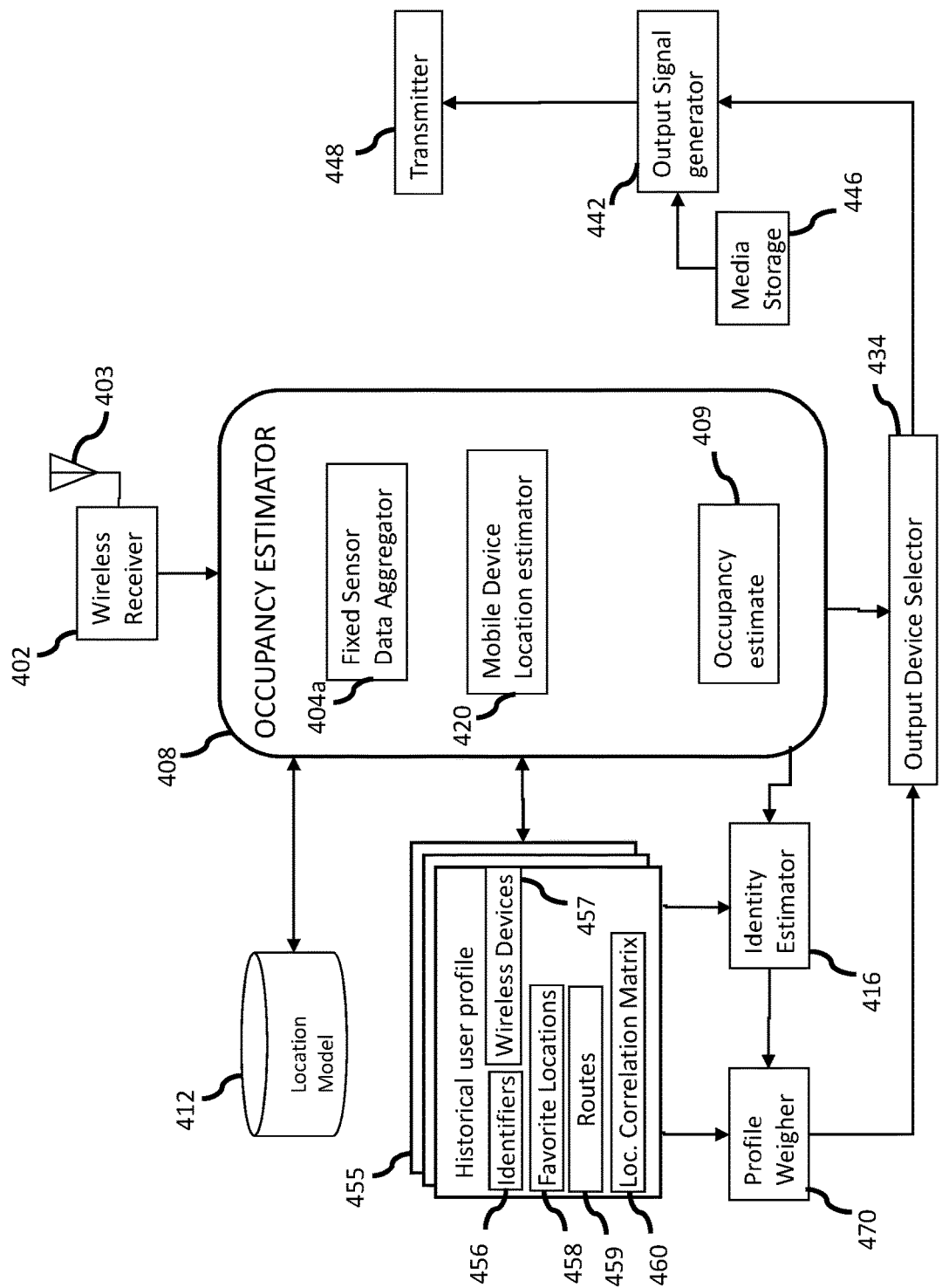
Figure 4D:
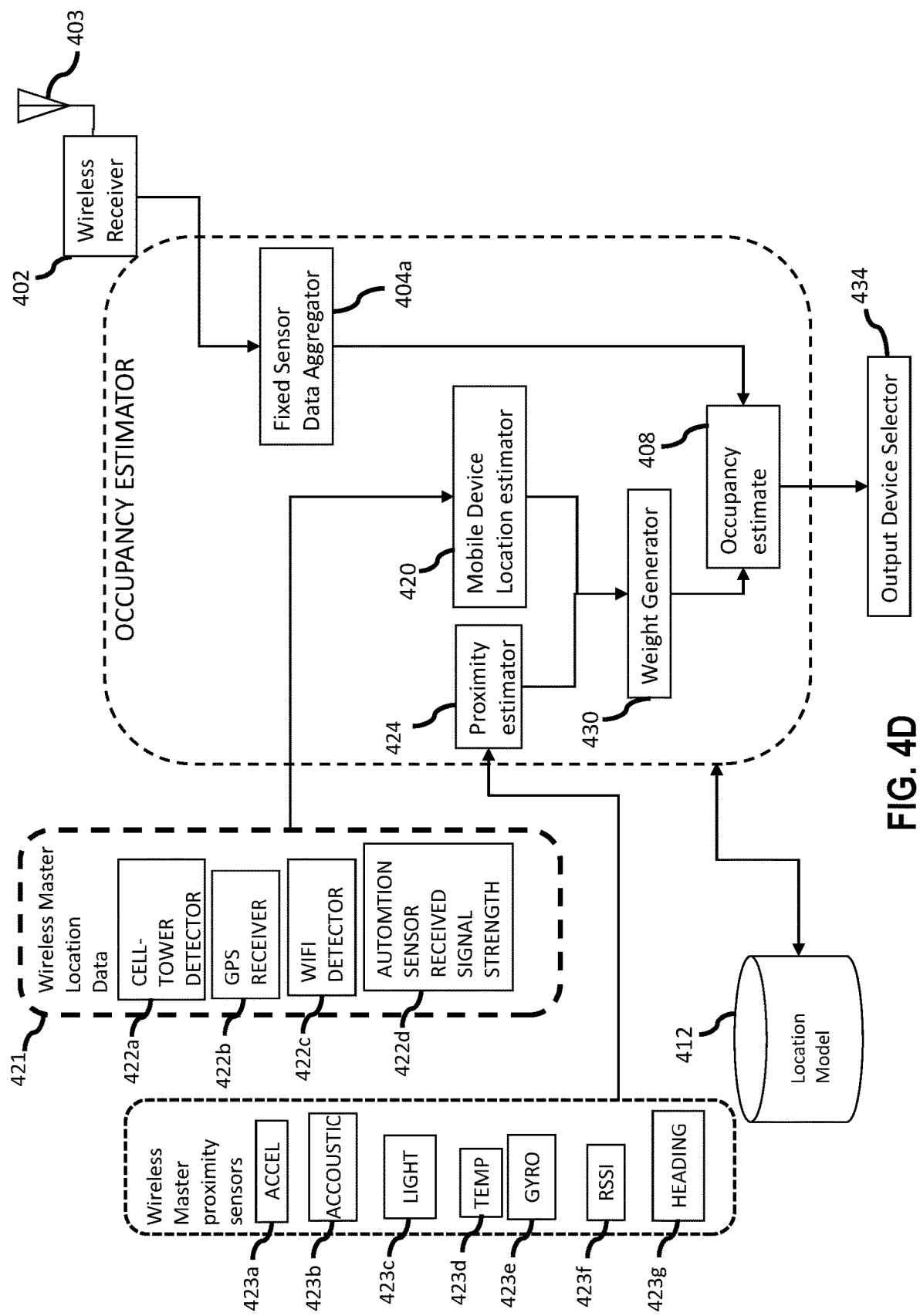

FIG. 4C illustrates an embodiment in which a central controller 150 uses a plurality of historical user profiles 455 in the process transmitting signals to output devices 110. A historical user profile 455 can be generated for one or more individuals who frequently or repeatedly occupy the building and account for some of the occupancy estimates. For the purposes of this disclosure the term "profile owner" is the individual associated with a historical user profile 455. A historical user profile can contain data regarding a profile owner's identity (e.g. a screen name, user ID a nickname or a unique identifier relative to other historical profiles or an assigned name in the central controller). A historical user profile 455 can contain data regarding previous locations and occupancy patterns within the building, common or favorite occupied regions, location patterns and daily routines (e.g. sequences of regions occupied) and average dwell times. Historical user profile 455 can include one or more profile identifiers 456. Identifiers 456 can be identifying descriptors for the profile owner (e.g. a name or a unique number corresponding to a person, a screen name, user ID, nickname or can be the next unused number in a sequence of available profile numbers at the time the profile is created.)

Historical user profile 455 can include data regarding a list of electronic devices 457 frequently used or associated with the profile owner. The list of associated devices 457 can be a hash table of electronic devices known to the central controller 150 and an indication (e.g. a binary "1") of the electronic devices in the hash table associated with the profile owner (e.g. a profile owner can be identified as the primary user of a dishwasher, car, tablet PC and smartphone #3 from within the known devices.) Historical user profile 455 can include a list of favorite location 458. Favorite locations 458 can be regions of the building frequently occupied by the profile owner. Favorite locations can be based on dwell times and frequency of visiting the same region or generating strong occupancy signals at the same fixed wireless sensors 120. Favorite locations can include an office, a home office, a preferred bathroom or bedroom. An advantage of the present disclosure is that separating favorite locations based on profile owners, can provide improved indication of individual user habits and correlation between regions of the building. This is an improvement over previous methods that averaged occupancy across all users. Favorite locations can include sequences of locations and routines based on the time of day.

Historical user profile 455 can include data regarding one or more routes 459 traveled by the profile owner. Routes 459 can include a list of regions and may contain the sequence in which regions are visited. Routes 459 can have an associated time of day or day of week (e.g. profile #1 with identity=Dad can contain morning sequence={Bedroom, Bathroom, Bedroom, Kitchen, Garage} and evening sequence={Garage, Kitchen, Home Office}.) Favorite locations 458 and routes 459 can have dwell times associated with them (e.g. average time spent in a room). Low dwell times for a region may indicate that the region is a waypoint between two rooms (e.g. a hallway).

Historical user profile 455 can include a location correlation matrix 460, indicating the probability that occupancy indications in a first region will be followed by occupancy in a second region at some time later. For example a motion sensor placed in a hallway can produce high occupancy estimates that can be time correlated with high occupancy estimates in rooms connected to the hallway a short time later. Two examples of location correlation matrices are illustrated as 910a and 910b in FIG. 9. Each element in the location correlation matrices 910a and 910b indicate the probability that occupancy in a first region of the building will be followed by occupancy indications in a second region some time later. Elements of a location correlation matrix 460 can be normalized, for example normalized to 10 (e.g. the first element 930a of location correlation matrix 910a is equal to 7 indicating that there is a 7/10 probability that region 1 will sense a person some time after initially sensing a person at sensor 1. In many cases the most likely future occupied region is the current occupied region. Similarly, location correlation matrix 910a indicates there is a 3/10 probability that a person sensed in region 1 will be sensed in region 2 at some time later. The second location correlation matrix 910b indicates there is a 2/10 probability that a high occupancy estimate in region 1 will be followed by a high occupancy indication in region 2 some time later.

Elements of the correlation matrices 910 can be stored as a series of probabilities corresponding to different times after some start time. For example, the start time can be indicated by detecting an aspect of a person at region #1. The memory required to store the location correlation matrix can be reduced by choosing an appropriate mathematical function (e.g. Gaussian probability distribution) to describe the time-dependent correlation between two regions. For example, the location correlation between activity in region #1 (e.g. kitchen) and a region #2 (e.g. bedroom) can be stored by storing the peak correlation (e.g. 0.3 or 30%) and the corresponding peak correlation time (e.g. the average time for a person to walk from the kitchen to the bedroom). It can be appreciated that the time correlation between different locations measured in this manner could vary greatly from person to person depending on their speed of walking and preferred routes. One method to capture the location correlation matrix in a compact manner is to store the peak proximity and the time associated with the peak probability (e.g. the maximum correlation =0.3 at t=5 seconds). A historical user profile 455 can further store one of a number of standard probability distributions that best fits the location correlation matrix corresponding to the historical distribution of arrival times for profile owner. It can be appreciated by those skilled in the art that shoring a location correlation matrix as a parameterized function (e.g. Gaussian distribution with peak probability of 0.3 and mean transition time of 5 seconds) is more efficient in comparison to storing the measured time-series correlation function between two regions of the building.

Data in a historical user profile 455 can be updated from a variety of data sources including, first data and second data, when the identity of an occupant can be determined with sufficient accuracy. Historical user profiles 455 can be stored in the central controller. It will also be apparent to a person of skill in the art that historical user profiles 455 can be stored remotely from the central controller 150 and accessed over a data network (e.g. World Wide Web, Ethernet, local area network).

Central controller 150 can generate and apply an identity criterion to identity estimates generated at 416. The central controller can begin by generating an occupancy estimate for a region of the building and an associated identity estimate for a person occupying the region. Central controller 150 can apply the identity criterion to the identity estimate. An example of an identity criterion is a confidence level (e.g. 75%) that the identity is correctly estimated. For example, in a building with four people the central controller may apply an identity criterion of 75% confidence level before initiating a person-specific automation response. In one embodiment, if the identity criterion is satisfied, the central controller 150 can modify one or more aspects of the corresponding historical user profile (e.g. favorite locations, routes or associated mobile wireless devices). This aspect provides means to ensure the accuracy and specificity of each historical user profile 455 to the profile owner.

Central controller 150 can include a profile weigher 470. Profile weigher 470 can receive one or more identity estimates from 416 and aspects (e.g. routes) from historical user profiles 455 corresponding to the identity estimates. Profile weigher 470 can weigh aspects of one or more profiles based on the identity estimate and can send identity weighted profile indications to output device selector 434.

In one embodiment of FIG. 4C the occupancy estimator can have a simplified structure including a fixed sensor data aggregator 404*a*, a mobile device location estimator 420 and an occupancy estimator 409. This embodiment does not need to have a proximity estimator and can rely on historical user profiles 455 and profile weighting at 470 to enhance output device selection at 434.

Description—Additional Embodiments

FIG. 4D illustrates an embodiment in which the central controller 150 is located inside a mobile wireless master device 155. In this embodiment the location estimator 420 can receive wireless master location data 421. Wireless master location data 421 is calculated similar to other mobile devices 130. The estimated location can be based on an analysis of one or more localization signals 165. Analysis of the signals can allow for an estimate as to which of external devices are relatively near the wireless master device 155, which can allow for an estimation of a location of the wireless master device 155. For example, the analysis can identify one or more Bluetooth beacons, fixed wireless sensors 120, automation devices 110, cell towers 170, GPS satellites 175 or WiFi access points 180. Devices transmitting localization signals 165 can be associated with a known location, such that a location of the wireless master device 155 can be estimated, e.g., via a triangulation or trilateration technique. In embodiments where central controller 150 is located inside a wireless master device 155 there is no need to wirelessly transmit wireless master location data 421 and instead the data can be transmitted by wired means (e.g. I2C, SPI, UART) to the mobile device location estimator 420. In the embodiment of FIG. 4D proximity estimator 424 can receive proximity data directly from proximity sensors 423*a-g* within the wireless master device. For example a tablet PC with a central controller can receive indications of person proximity from an onboard accelerometer 423*a*, microphone 423*b*, light sensor 423*c*, temperature sensor 423*d*, gyroscope 423*e*, signal strength indicator 423*f*, or magnetometer 423*g*.

In some embodiments one or more elements of the central controller can be remotely located (e.g. located in a server bank) relative to the other elements. Examples of elements that could be remotely located include data aggregators 404, proximity estimator 424, mobile device location estimator 420, weight generator 430, location model 412, identity estimator 416, media storage 446 and output device selector 434. Remote located elements can be operably connected to the building based elements of the central controller via a communication network (e.g. World Wide Web, Ethernet, Local Area network LAN). In some embodiments the majority of the elements comprising the central controller can be located outside of the building containing the plurality of fixed wireless sensors and mobile wireless devices. For example only the one or more wireless receivers 402, transmitter 448 and output signals generator 442 need be located in or close to the building 115. In this way the central controller can be embodied as a plurality of cost effective receivers, transmitters and signal generators in or close to a home and more costly elements can be stored in a secure remote location allowing for maintenance and upgrades. While advances in remote computing can enable several elements of the central controller to be remotely housed from the indoor transceivers the central functionality of augmenting fixed building based sensor indications with proximity-weighted mobile device location indications remains largely unchanged.

In another aspect there has been significant progress towards integrating multiple integrated circuited into multichip modules. One example is the Intel Edison module available from Intel of Santa Clara Calif. In one embodiment of this disclosure many of the central controller elements can be disposed on a multichip module. Receivers 402 can be embodied as a combination Bluetooth/WiFi transceiver, aggregators 404*a* and 404*b* can be embodied in cache RAM or FLASH memory. The mobile device location estimator 420 can be software running on a processor with an arithmetic logic unit to calculate estimated device locations, the weight generator and proximity estimators can be fixed algorithms or machine learning algorithms running on a processor or a neural network tree within a microchip. Historical user profiles 455 and location models 412 can be stored in local memories or stored on a remote server.

Operation

In one embodiment the operation of a central controller to transmit signals to one or more output devices can include the following steps. Fixed wireless sensors transmit first signals to the central controller upon sensing occupancy within an indoor space. One or more mobile devices can calculate location data indicative of the device geographic position and proximity data indicative of the mobile device proximity to a person. The mobile devices can transmit mobile device signals, containing location and proximity data. The central controller receives first and mobile device signals, calculates a person proximity indication for each mobile device and weights mobile device location estimates based on the proximity indication. The central controller can estimate the occupancy of one or more regions of the building based on the occupancy indications in first signals and the proximity-weighted device locations. The central controller 150 can select one or more building automation devices 110, based in part on the proximity-weighted location estimates. Mobile devices 130*a* that are proximal to people 152 can indicate their proximity and be weighted more heavily in the process of selecting one or more output devices. Similarly, mobile devices 130*b* that have been left unattended (e.g., on a desk 160) can indicate their lack of proximity, and receive lower weighting and relevance when the central controller select output devices 110.

Figure 5:
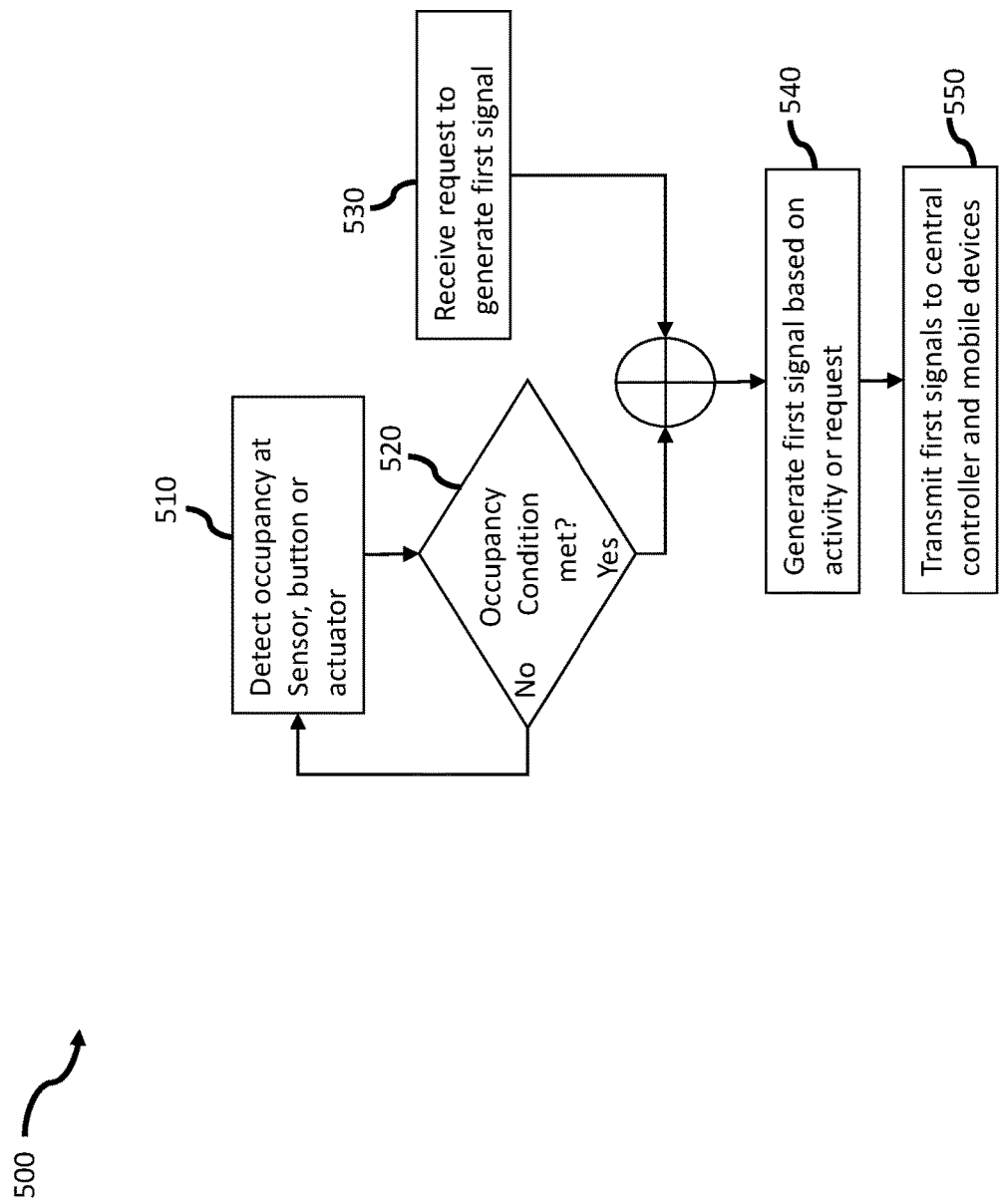
FIG. 5 illustrates a flow diagram of a process for generating and transmitting first signals from a fixed wireless sensor according to an aspect of the technology.

FIG. 5 is a flow diagram for a process 500 of generating first signals 140 at a fixed wireless sensor 120, in accordance with one embodiment of this disclosure. At block 510 one or more analog sensors 200a-g, buttons 205a or actuators 205b can detect an aspect of a person. At block 520 sensor samples can be processed to form first data. Processing to form first data can be performed by a processor 240, circuitry or software. At block 520 the determination of sufficiently indicative sensor data can be based in part on adaptive algorithms executed by the processor 240. The adaptive algorithms can increase threshold values to reduce false positives caused by sources non-human sources e.g. pets, swaying trees, changes in room temperature and HVAC systems operation. Examples of first data include raw sensor values, maximum sensor values in a time period, average sensor values, combinations of sensor values operable to indicate occupancy. For example some motion sensors use passive infrared and ultrasound in combination to estimate occupancy. Fixed wireless sensor 120 can have a field of view and first data can be occupancy indications in a region that comprises that field of view. First data can be indicative that the region sensed by a fixed wireless sensor is unoccupied. In some embodiments an analog circuit can replace the function of the CPU and generate first data based on an analog transformation of sensor, button or actuator values. For example an analog motion detector can have a PIR sensor 200e, and analog amplifier wherein motion values above a particular threshold can cause the analog amplifier to generate a first signals with an indication of occupancy in the field of sensing of the wireless sensor.

At block 530 one or more signals can be received, instructing the fixed wireless sensor to generate first signals in the absence of the activity condition being met. This can happen in response to the central controller 150 or other fixed wireless sensors 110 detecting sufficient activity and requesting fixed wireless sensors to report data for comparison and for location purposes.

At block 540 one or more signals can be generated (e.g. by the signal generator block 230). The signals can include a unique identifier of the fixed wireless sensor and raw or processed sensor data. The signal can be generated in accordance with the communication protocol 220. At block 550 the first signal can be transmitted.

Figure 6:
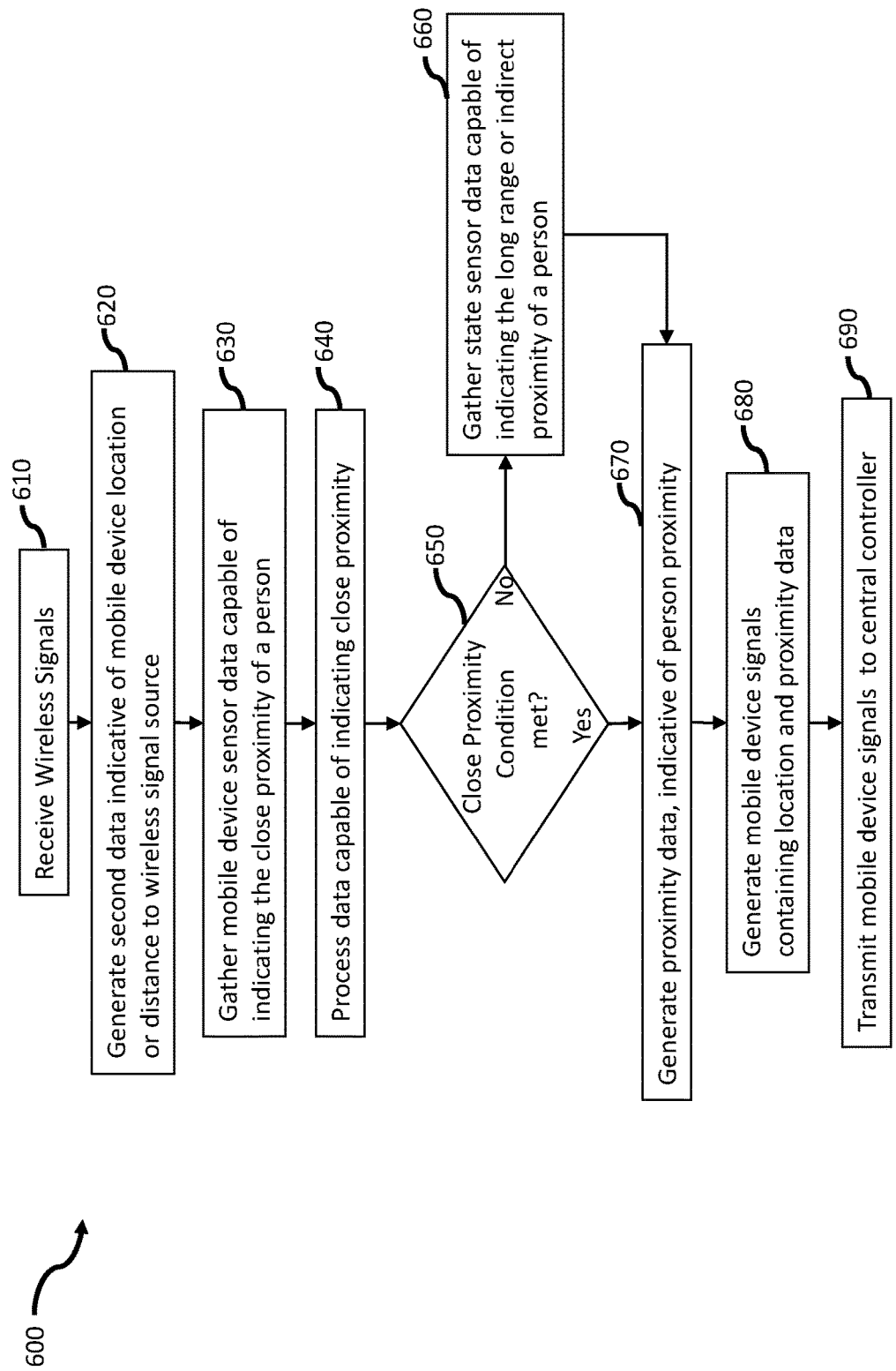
FIG. 6 illustrates a flow diagram of a process for generating and transmitting mobile device signals from a mobile wireless device according to an aspect of the technology.

FIG. 6 is a flow diagram for a process 600 of generating mobile device signals 185 at a mobile device 130. At block 610 the mobile wireless device 130 can receive wireless localization signal 165. The wireless localization signals 165 can provide geo-location data (e.g. a GPS satellite 175) or can be signals from for example a cell-tower 170, WiFi router 180, Bluetooth beacon, home automation device 110 or fixed wireless sensor 120. At block 620 wireless localization signals 165 can be processed by the mobile device location estimator 315 to generate an indication of mobile device location. The location estimate can be a distance estimate from one or more transmitters or can be a measure of the relative signal strength from several transmitters. At block 630 sensor data is gathered from mobile sensors indicative of device state (e.g. power state, angle, direction relative to magnetic north) and sensor data indicative of close proximity to a person (e.g. acceleration associated with being handheld, placement in a pocket purse, angle or vibration indicative of being handheld). At block 630 data indicative of direct user interaction such as typing or pressing a touchscreen can be gathered.

At block 640 the data from block 630 is processed to identify an indication of close proximity to a person (e.g. monitoring acceleration over time). The processing can occur in the data processor 320 and can involve various degrees of processing including filtering, maximum and minimum value detection, pattern recognition and principal component analysis.

At block 650 the processed data from block 640 is evaluated to determine if the mobile wireless device has direct proximity to a person (e.g. direct user input or sensor data indicative of direct proximity). If the direct proximity condition is not met additional sensor data is gathered at block 660, indicative of long range or indirect proximity of a person (e.g. acoustic indication of a person close by, vibration indication of a person close by or changes in signal strength indicative of a person close by). In some embodiments, if the close proximity condition is met at block 650 the mobile device can skip block 660.

At block 670 proximity data indicative of direct and indirect person proximity is gathered. Proximity data can also include device state sensor data (e.g. tilt angle relative to the ground, direction relative to magnetic north). Blocks 630-670 can be executed by the data processor 320.

In some embodiments, blocks 630-670 can be executed in a repeated loop in order to maintain an up-to-data indication of person proximity. This may be beneficial in situations where there is rapidly changing or constantly varying proximity.

In some embodiments, the mobile device can maintain an up-to-date flag or variable indicating direct person proximity, indirect proximity or no proximity. The flag or variable can be generated using some of blocks 630-670. The proximity flag can be used to indicate direct or indirect person proximity and one some or all of blocks 630-670 can be skipped.

At block 680 mobile device signals are generated including location and proximity data, in accordance with the communication protocol 340. At block 690 one or more mobile device signals are transmitted by the wireless transmitter 350 to the central controller 130.

Figure 7:
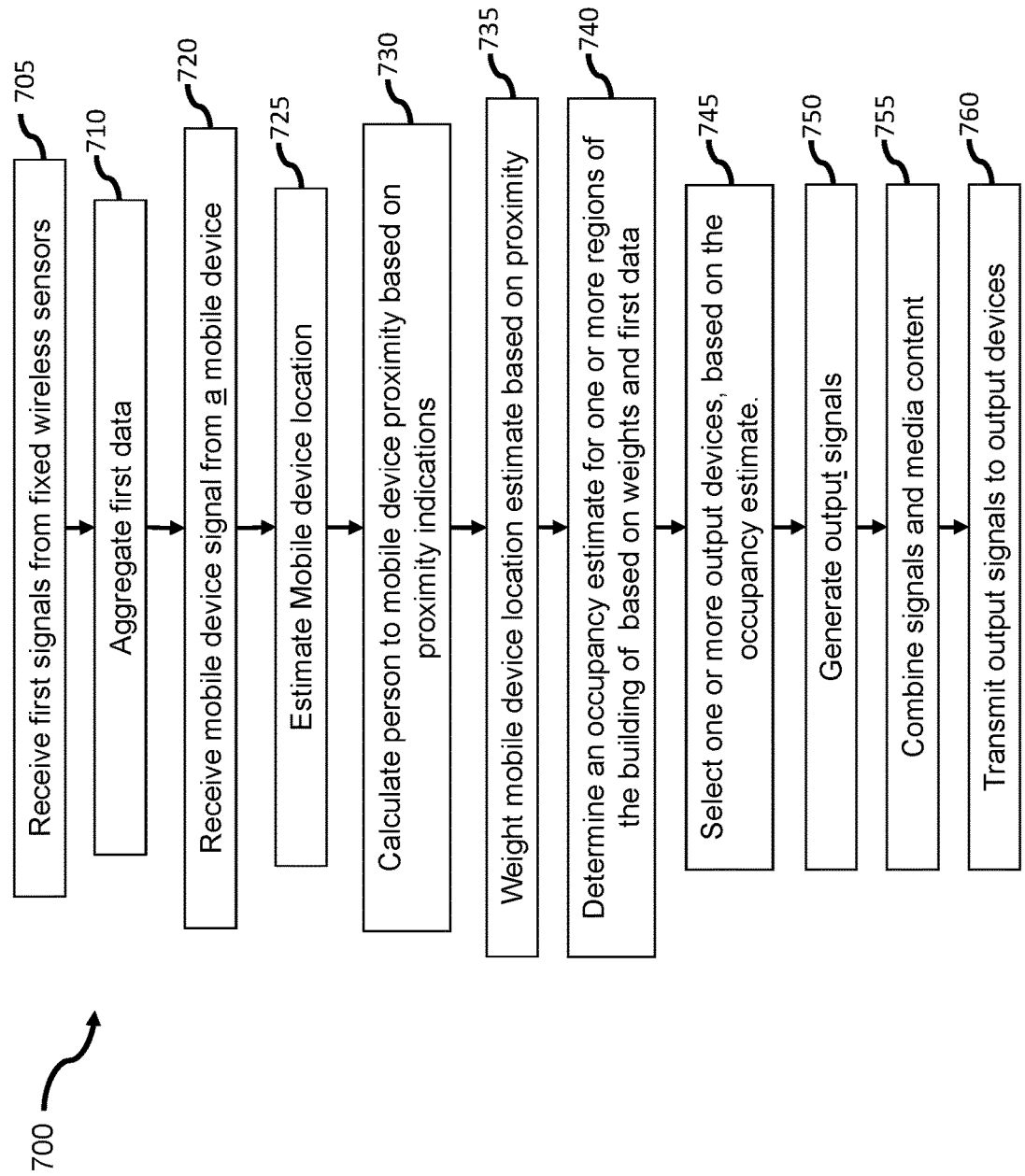
FIG. 7 illustrates a flow diagram of a process wherein a central controller chooses one or more output devices, according to an aspect of the technology.

FIG. 7 is a flow diagram of a process for transmitting output signals to one or more output electronic devices according to aspects of the present technology. At block 705 the central controller receives first signals 140, containing sensor data indicative of occupancy of a region of the building form fixed wireless sensors 120. At block 710 first data is aggregated to gather sufficient samples and to highlight important events (e.g. the maximum sensor reading for a sensor among the last 10 readings). At block 720 central controller 150 receives mobile device signals 185 from a mobile device, where mobile device signals contain data indicative of mobile device location and data indicative of proximity between a mobile device and one or more people. At block 725 central controller 150 estimates the location of the mobile device. At block 730 central controller 150 estimates the proximity of a person to the mobile device. At block 735 central controller 150 calculates weights for the device location estimate from 720, whereby the weights are chosen based in part on the proximity value calculated at 730. In some embodiments, the weights for both the mobile device location estimate and aggregated first data are calculated at block 730. In yet other embodiments, the weights for the mobile device location are calculated based on the person proximity estimate and the based on the aggregated first data. At block 740 an occupancy estimate is generated for one or more regions of the building, based on the weights and first data.

At block 745 central controller 150 can select one or more of output devices 110, whereby the output devices are selected based in part on the occupancy estimate. In another embodiment at block 750 central controller 150 generates output signals, wherein at least some of the data in output signals is based on the occupancy estimate for one or more regions of the building. At block 755 central controller 150 can combine commands with media content or other data to be sent to at least some of the subset selected at block 745 to generate output wireless signals. At block 760 central controller 150 transmits output wireless signals to one or more output devices.

Figure 8:
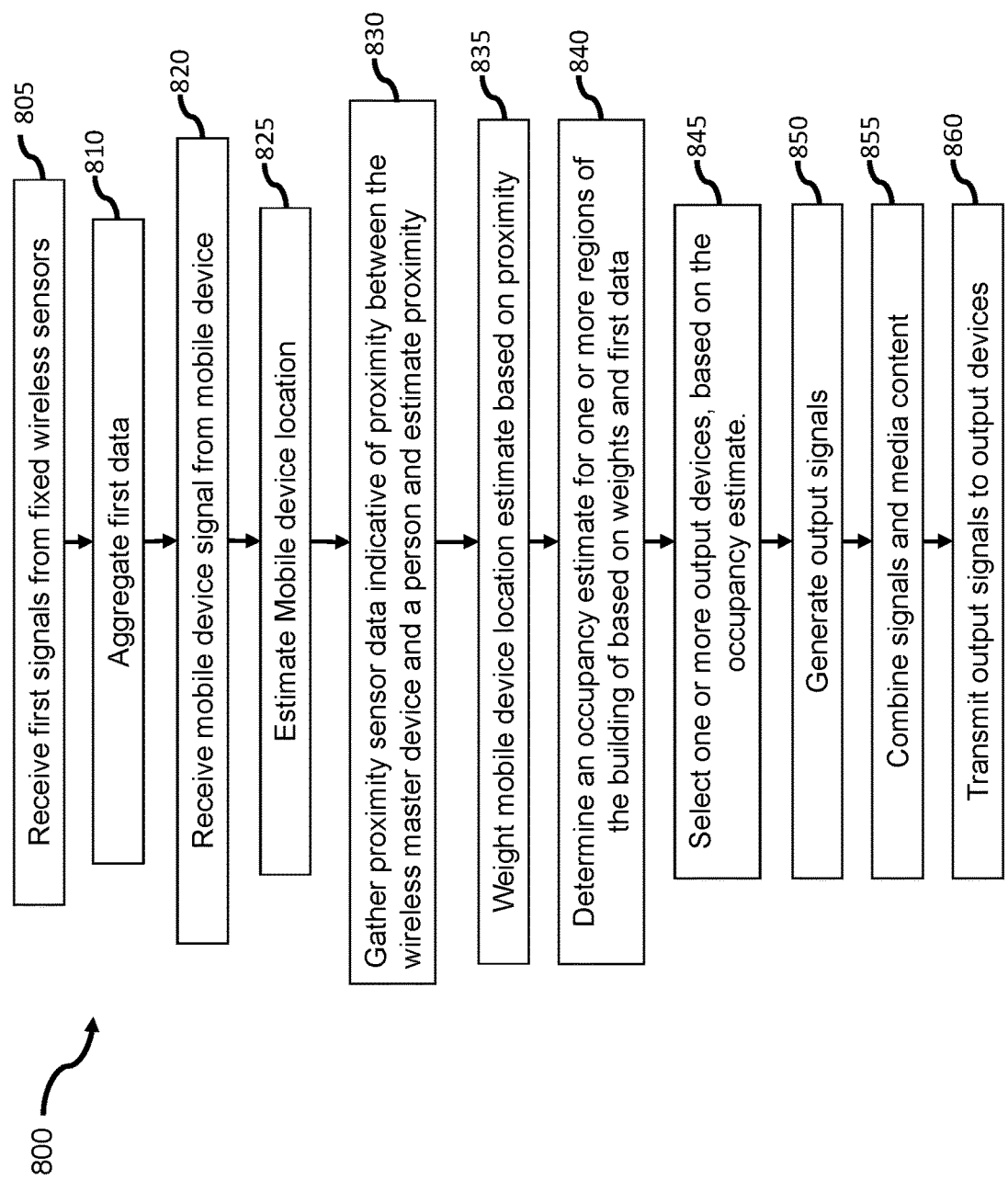
FIG. 8 illustrates a flow diagram of a process wherein a central controller chooses one or more output devices, according to an aspect of the technology.

FIG. 8 is a flow diagram of the operation of a central controller that is housed inside a mobile wireless device and is operable to send output signals 190 to one or more output devices 110 according to an aspect of the technology. At block 805 the central controller receives first signals, containing sensor data indicative of occupancy of a region of the building form fixed wireless sensors 120. At block 810 first data is aggregated to gather sufficient samples and to highlight important events (e.g. the maximum sensor reading for a sensor among the last 10 readings). At block 820 central controller 150 receives mobile device signals from a mobile device, where mobile device signals contain data indicative of mobile device location and data indicative of proximity between a mobile device and one or more people. At block 825 central controller 150 estimates the location of the mobile device. At block 830 controller 150 gathers data from proximity sensors 423a-g associated with the wireless master device 155 and central controller estimates the proximity of a person to one or more mobile wireless devices 130. At block 835 central controller 150 calculates weights for the device location estimate from 820, whereby the weights are chosen in part based on the proximity value calculated at 830. In some embodiments the weights for both the mobile device location estimate and aggregated first data are calculated at block 830. In yet other embodiments the weights for the mobile device location are calculated based on the person proximity estimate and the based on the aggregated first data. At block 840 an occupancy estimate is generated for one or more regions of the building, based on the weights and first data.

At block 845 central controller 150 can select one or more of output devices 110, whereby the output devices are selected based in part on the occupancy estimate. In another embodiment at block 850 central controller 150 generates output signals, wherein at least some of the data in output signals is based on the occupancy estimate for one or more regions of the building. At block 855 central controller 150 can combine commands with media content or other data to be sent to at least some of the subset selected at block 845 to generate output wireless signals. At block 860 central controller 150 transmits output wireless signals to one or more output devices.

Figure 9:
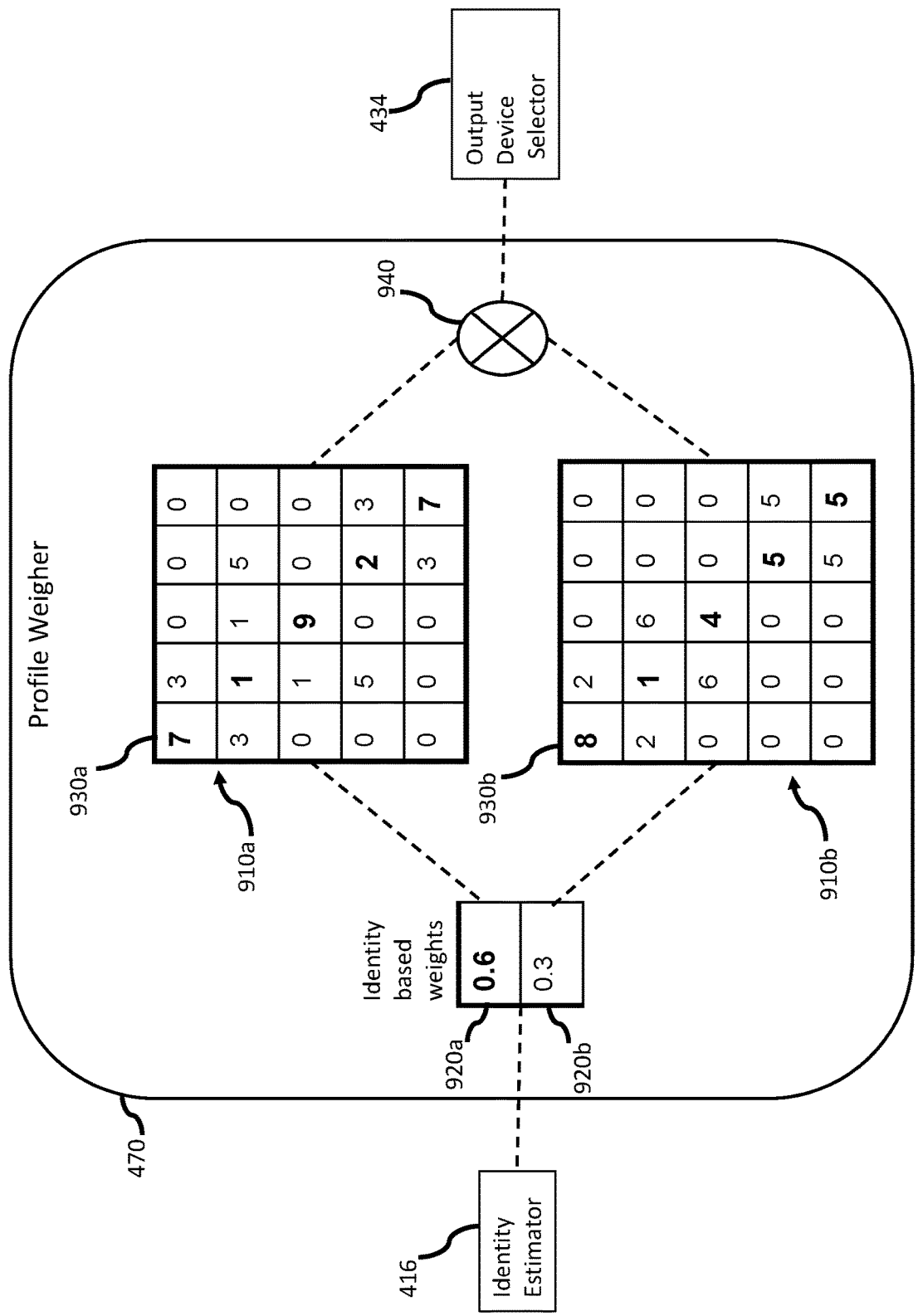
FIG. 9 is a functional diagram of two location correlation matrices being combined with profile weights to form a weighted location correlation matrix in accordance with an embodiment of the present invention.

FIG. 9 is a functional diagram of the operation of the historical profile weigher 470. FIG. 9 shows two location correlation matrices 910a and 910b correspond to two people, who may be responsible for occupancy indications. Each correlation matrix 910a and 910b relates present and future occupancy in five regions of the building. Location correlation matrices 910a and 910b are weighed by profile weigher 470 in accordance with two identity estimates from 416. In this embodiment the profile weigher generates weighted location correlation matrices that can be combined by a summation circuit 940. Central controller can select output devices based on the combined result.

In the embodiment of FIG. 9 identity estimator 416 transmits a plurality of identity estimates to profile weigher 470. For example identity estimator can transmit three identity estimates corresponding to three identities established in the central controller: 0.6 for FATHER 0.3 for MOTHER and 0.1 for CHILD. Profile weigher 470 can generate profile based weights 920a and 920b based on two of the identity estimates. In some embodiments the profile weigher can use identity estimates as profile weights, in other embodiments the profile weigher can perform various degrees of process on identity estimates to form profile weights. For example low identity estimates can be neglected, only the highest identity estimate can be converted into a profile weight or the first N highest identity estimates can be converted (e.g. N=2). In the example of FIG. 9 the two highest identity estimates are converted to profile weights (0.6 for FATHER and 0.3 for MOTHER). Profile weigher 470 can access the historical user profiles 455 associated with the profile weights and can select one or more common aspects from each profile. In the embodiment of FIG. 9 two location correlation matrices are chose corresponding to the two highest identity estimates. Each correlation matrix 910 can be weighted by the corresponding profile weighting 920a and 920b (e.g. each element of each matrix can be multiplied by the profile weighting). The weighted correlation matrices can be combined a combiner 940. The combiner can be software or a circuit operable to combine a plurality of weighted aspects of historical profiles. Example of operations performed by the combiner can include summation or identification of a highly weighted region of the building. The combiner 940 can produce an occupancy estimate for one or more regions of the building. In one aspect the combiner can generate occupancy estimates for a time in the near future (e.g. 1-10 seconds later or several minutes later). In this way the profile weigher 470 can generate an estimate of future occupancy, based in part on knowledge of the occupant's identity and provide this future occupancy estimate to the output device selector 434.

Figure 10:
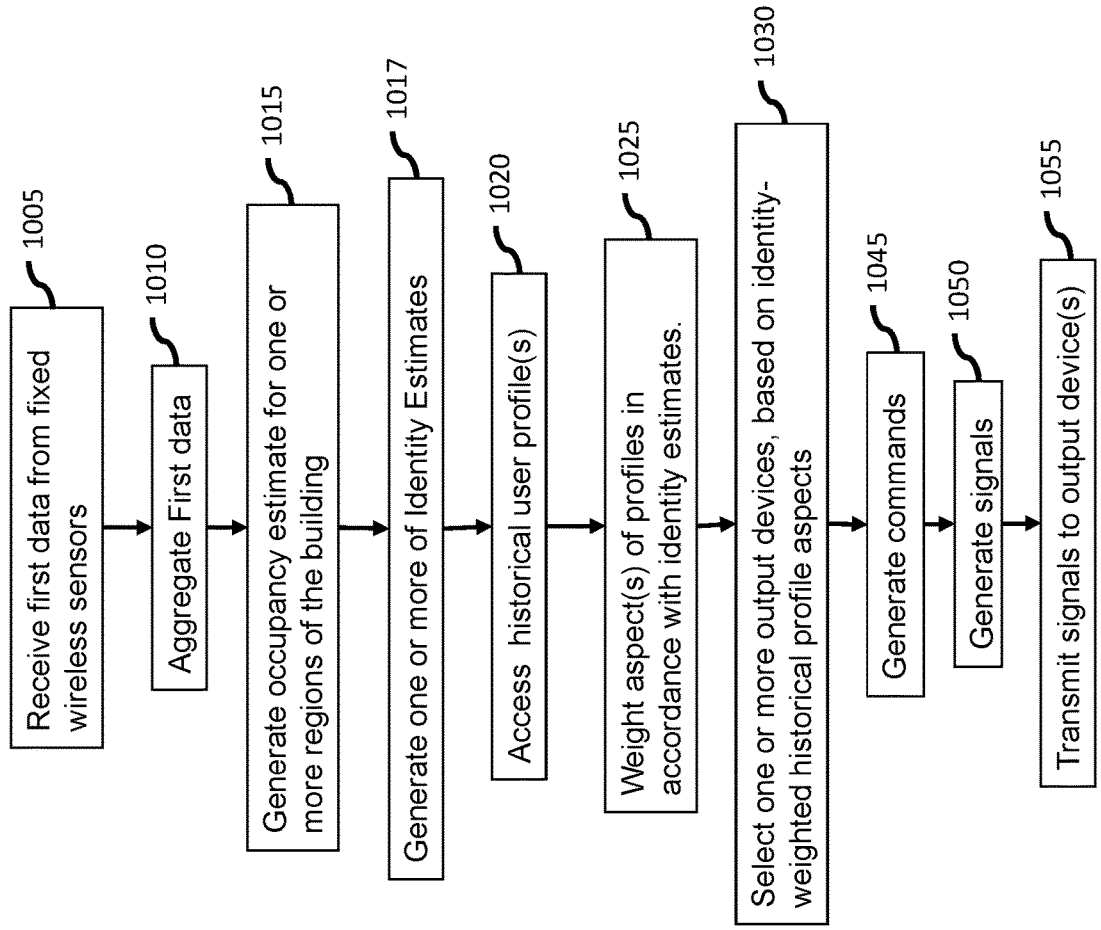
FIG. 10 illustrates a flow diagram of a process wherein a central controller chooses one or more output devices, according to an aspect of the technology.

FIG. 10 is a flow diagram of the process for transmitting output signals 190 to one or more output electronic devices 110 according to aspects of the present technology. At block 1005 the central controller can receives first signals 140, containing sensor data indicative of a person form fixed wireless nodes 120. At block 1005 central controller 150 can also receive mobile device signals from one or more mobile wireless devices 130. At block 1010 central controller 150 aggregates first data to gather sufficient samples and to highlight important events (e.g. the maximum sensor reading for a sensor among the last 10 readings). At block 1015 central controller 150 can generate an occupancy estimate for one or more regions of the building. A variety of other data sources can be used at block 1015 to enhance the location estimate, including, the location model and one or more historical user profiles. At block 1017 central controller 150 generates a plurality of identity estimates associates with first data or occupancy estimate for one or more regions or first data indicative of occupancy. For examples a building can have five workers, and the central controller can estimate the probability that each of the workers is responsible for the occupancy estimate. The identity estimator 416 can use a variety of techniques at block 1017 to predict the identity of a person including, location pattern recognition, audio analysis, historical correlation, or recent strong proximity with mobile wireless devices associated with a primary user. For example a motion sensor associated with a building may not be able to independently associate first data with a particular family member. However if strong motion signals in first data are occasionally concurrent with strong proximity-weighted smartphone location indications from a smartphone associated with a first family member and rarely or never concurrent with the presence of other family members mobile devices, then the identity estimator 416 can, generate multiple identity estimates and generate a high probability estimate for the first family member. Estimates of identity may be binary corresponding to possible and impossible (e.g. it is possible that the occupant has identity A, B, or D but not C, E or F)

At block 1020 central controller 150 accesses one or more historical user profiles 455, containing historical user-specific occupancy data for example occupancy patterns, favorite locations 458, common destinations, common routes 459 (e.g. frequently going to the kitchen from the living room). Historical user profiles 455 can include a location correlation matrix 450. In some embodiments central controller 150 can further access a location model 412 for the indoor space.

At block 1025 weights can be calculated for one or more aspects of one or more historical user profiles, whereby weighting are based in part on the identity estimates generated at 1017. At block 1030 central controller 150 can select one or more of output devices 110, whereby the output devices are selected based in part on one or more identity-weighted historical user profile aspects. At block 1045 central controller 150 can generate commands for the selected output devices. In another embodiment at block 1050 central controller 150 generates output signals, wherein at least some of the data in output signals can be based on one or more identity-weighted historical profile aspects. At block 1050 central controller 150 can combine commands with media content or other data to be sent to at least some of the output devices selected at block 1030 to generate output wireless signals 190. At block 1055 central controller 150 transmits output signals 190 to one or more output devices 110.

The following are example of the operation of several embodiment of the present disclosure. In one example, a person is located in a house with several fixed motion sensors and mobile wireless devices and an automated lighting system. The person is types at a computer and is producing weak occupancy indications measured by the motion sensors. A smartphone associated with the person is on the desk nearby and reports the sound of typing as proximity indications to the central controller. The central controller processes occupancy sensor data from the smartphone and several other mobile devices (e.g. Tablet PC elsewhere in the home). The central controller determines a higher weighting for the smartphone location, relative to the weak fixed motion sensor readings, based in part on an indirect proximity estimate provided by the typing sound data. In some cases the central controller, can commands the fixed motion sensors to transmit first signals, thereby enabling the smartphone to better estimate a location. The central controller can estimate the location of the person based on the smartphone and command the subset of automated lights in the room to remain on, even in the absence strong motion sensor signals.

In another example with the same setup the person gets up from their desk in the home office to go to the kitchen, the fixed wireless motion sensors detect the motion and issues first signals. The smartphone can report proximity data to the central controller indicating that it is stationary on the desk in the home-office (e.g. zero degree elevation), coincident with the motion indications, and therefore the central controller can combine these pieces of information and determine that the smartphone no longer has close proximity to the person. In this case, the phone is not moving with the person and the central controller weights the smartphone location data lower in the overall person location prediction. The advantage of the disclosed system is that smartphone location data can be rapidly deprioritized in favor of the fixed wireless senor data, thereby providing more accurate occupancy indication of various regions throughout the scenario.

In another example with the same setup the person gets up from a desk in the home-office to go to the kitchen and carries their smartphone in their pocket. The fixed motion sensors detect the motion and transmit first signals to the central controller. The mobile wireless devices report their locations to the central controller, in some cases using first signals as localization signals sources. In this case, the smartphone indicates strong proximity to the primary user, based on the acceleration and orientation, coincident with the motion signals. The smartphone issues a strong proximity flag as part of a mobile device signal to the central controller. The central controller applied a large weight to the smartphone location data based on the strong proximity flag and estimates the occupancy of several regions in accordance with the motion signals and smartphone location and commands the automated lighting to turn on in a predictive manner as the person walks to the kitchen.

In another example with the same setup the person is walking with their smartphone in their pocket. The proximity data in mobile device signals indicates the orientation of the smartphone antenna and placement of the person relative to the smartphone. The central controller uses the proximity data (angle and placement and compass heading) to calculate a correction factor for the mobile device location estimate to account for shadowing effect of the person's body, thereby improving person location accuracy.

In another example, a home is equipped with a system of integrated wireless speakers. Two people are present in the home, the first person is studying in a home office, the second is watching television while and periodically interacting with a tablet PC. The television watcher puts the tablet PC down on a coffee table and moves towards the kitchen. The tablet PC reports an abrupt change in person proximity (e.g. transition from handheld to flat elevation). The central controller receives motion signals from fixed sensors near the tablet PC and estimates the identity of the person associated with the motion to be the primary user of the tablet PC, based on the device-proximity change. The identity estimate can be further reinforced by a location model accessed by the central controller indicating that the tablet PC estimated location is historically correlated with the motion signals from fixed sensors. Based on the motion signals, estimated occupancy and estimated identity, the central controller estimates the present and future location of the television watcher as they move to the kitchen and commands the wireless sound system to transfer the television audio to the kitchen. The system does not disturb the person studying in the office, based in part on their determined proximity to their smartphone.

In another example a central controller can receive first signals from a plurality of motion sensors indicating that a person is walking down a hallway in a building. The person can pick up a wireless car keyfob. The car key fob can report its location and an indication of proximity to a person (e.g. based on recent motion) in mobile device signals to the central controller. The central controller can generate weights for several mobile devices and weigh the keyfob location estimate more heavily relative to other mobile wireless devices in the process of estimating the occupancy of a region of the building. The central controller generate output signals that contain settings specific to the primary user of the keyfob (e.g. turn off the coffee maker or turn a television to a particular channel), based in part on the weights.

In another example a person enters a room, sits on a sofa and periodically checks their cellular phone for new messages. If the person sits quietly, wireless motion sensors can report low indications of occupancy and previous automation systems may eventually assume the person has left the room. The disclosed system enables recent estimates of person-to-device proximity to cause a high occupancy weighting for the cellular phone location. Similarly, the disclosed system provides means to reduce the cellular phone location weighting if the central controller receives new first data indicates that the person is walking while new proximity indications from the cellular phone indicates that it is remaining stationary.

Figure 11B:
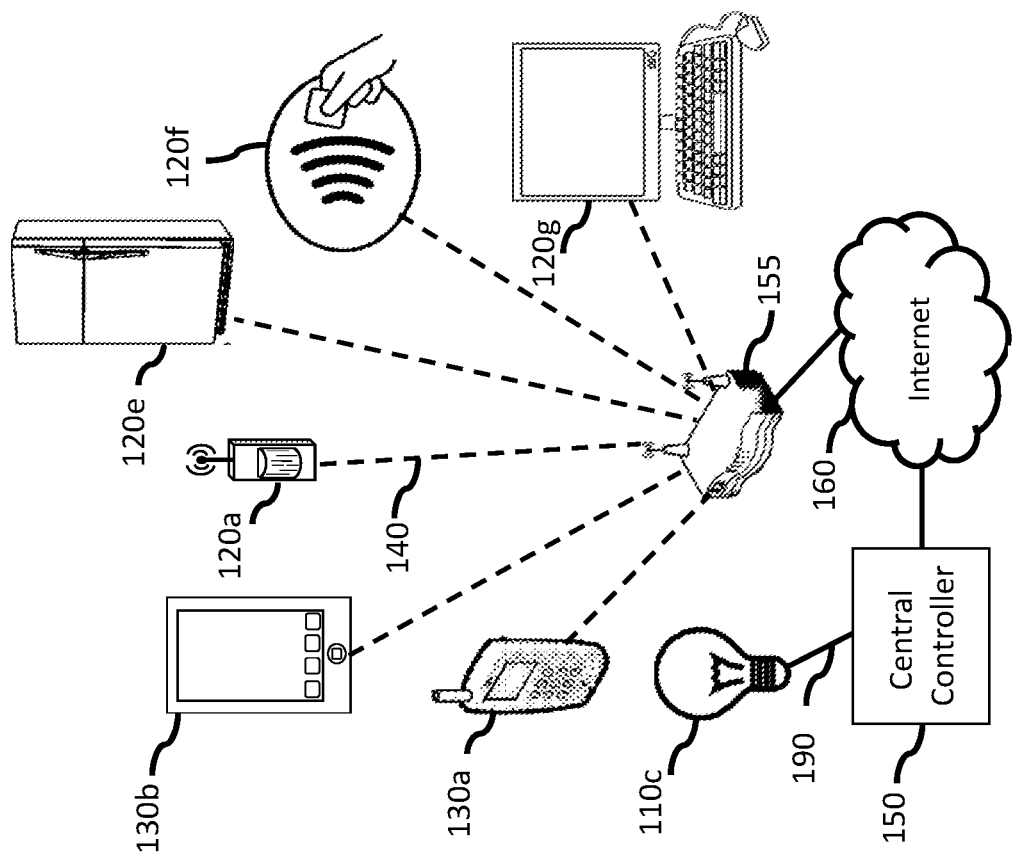
FIG. 11A and FIG. 11B illustrate exemplary devices operable to report data indicative of the presence of one or more people to a central controller and to be controlled by the central controller.
Figure 11A:
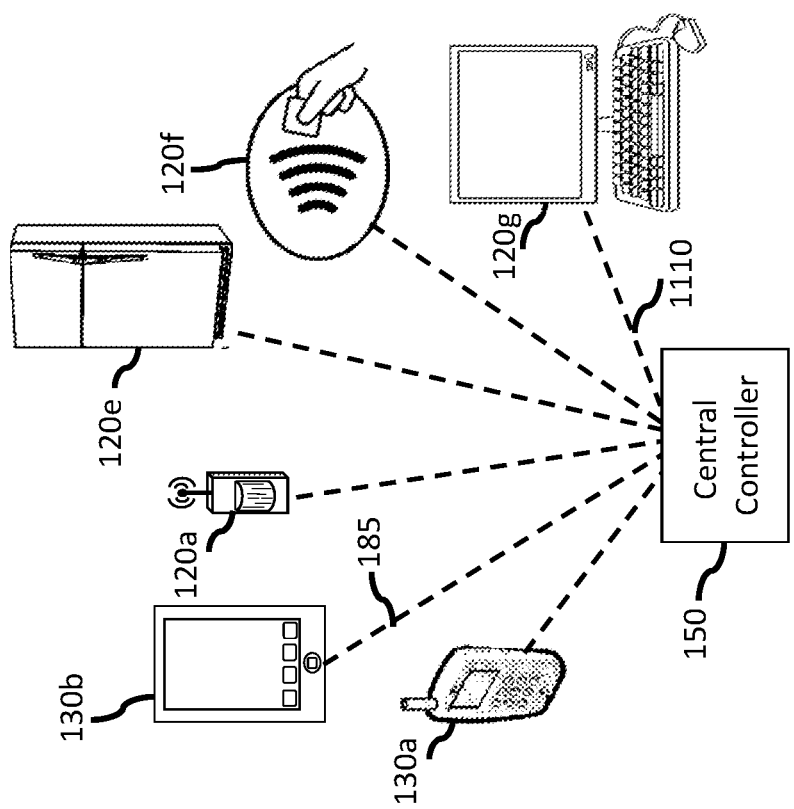

In FIG. 11A the central controller 150 receives signals directly from some or all reporting device in the network. Central controller 150 can receive signals 140 and 185 from device, including network-connected devices and mobile wireless devices using any of a variety of custom or standard wireless protocols (Wi-Fi, Bluetooth, Zigbee, 3G/4G, 6LoWPAN, Z-wave etc.). Central controller 150 can further receive signals from devices using a variety of custom or standard wired protocols (Ethernet-over-powerline, USB, CAT6 Ethernet, I2C etc.). In FIG. 1A central controller 150 can be a smart home internet gateway such as Qualcomm® VIVE™ available from Qualcomm Inc. of San Diego Calif. In some embodiments central controller 150 can be a standalone fixed location device, similar to a Wi-Fi router or DSL modem.

In FIG. 11B signals from some or all devices are aggregated at a network gateway 155. The network gateway can serve as a bridge between a local area network and a wide area network (e.g. the World Wide Web). Network gateway 155 can be a building-based wireless router such as model TG852G available from Comcast Corporation of Philadelphia Pa. The network gateway 155 can be located in or close to the building. In other embodiments the network gateway 155 can be a bridge between a sensor network protocol (e.g. Z-wave, BLE, Zigbee) and an internet protocol, such as the SmartThings hub available from SmartThings Inc. of Palo Alto Calif. The network of devices can be operably connected to transmit sensor data and training data to a remotely located central controller 150 through the network gateway 155 via a connection to the internet 160. The central controller 150 can be remotely located (e.g. in a data center) and can service many buildings at once. In some embodiments network gateway 155 can gather sensor data from first signals 140 from one or more devices in the network and relay one or more signals to a central controller using a protocol different from that used to form the first signals. For example first signals 140 may be received as low-energy Bluetooth packets at a network gateway 155. The network gateway may aggregate sensor data from one or more first signals and form internet protocol packets (e.g. UDP or TCP/IP) that are transmitted to a remote located central controller 150. In another embodiment first devices could transmit Bluetooth packets with internet protocol format (e.g., IPv6) to a network gateway 155 enabling a more direct relaying of the packets through a Bluetooth enabled relay server to a central controller. The central controller can be located up to several thousand miles away and require complex routing of the internet protocol packets through one or more routers to reach the central controller.

In another embodiment the central controller may be located in the building and access remote memory storage located a long distance away via a communication network such as World Wide Web, cellular wireless communication or FTP. In several embodiments central controller 150 can transmit output signals 190 to control one or client devices (e.g. light bulb 110c) in the enclosed space. In one embodiment it can be beneficial to divide the hardware used to perform the occupant counting method between the enclosed space and a remote data center. A remotely located central controller can control many buildings at once.

Figure 12:
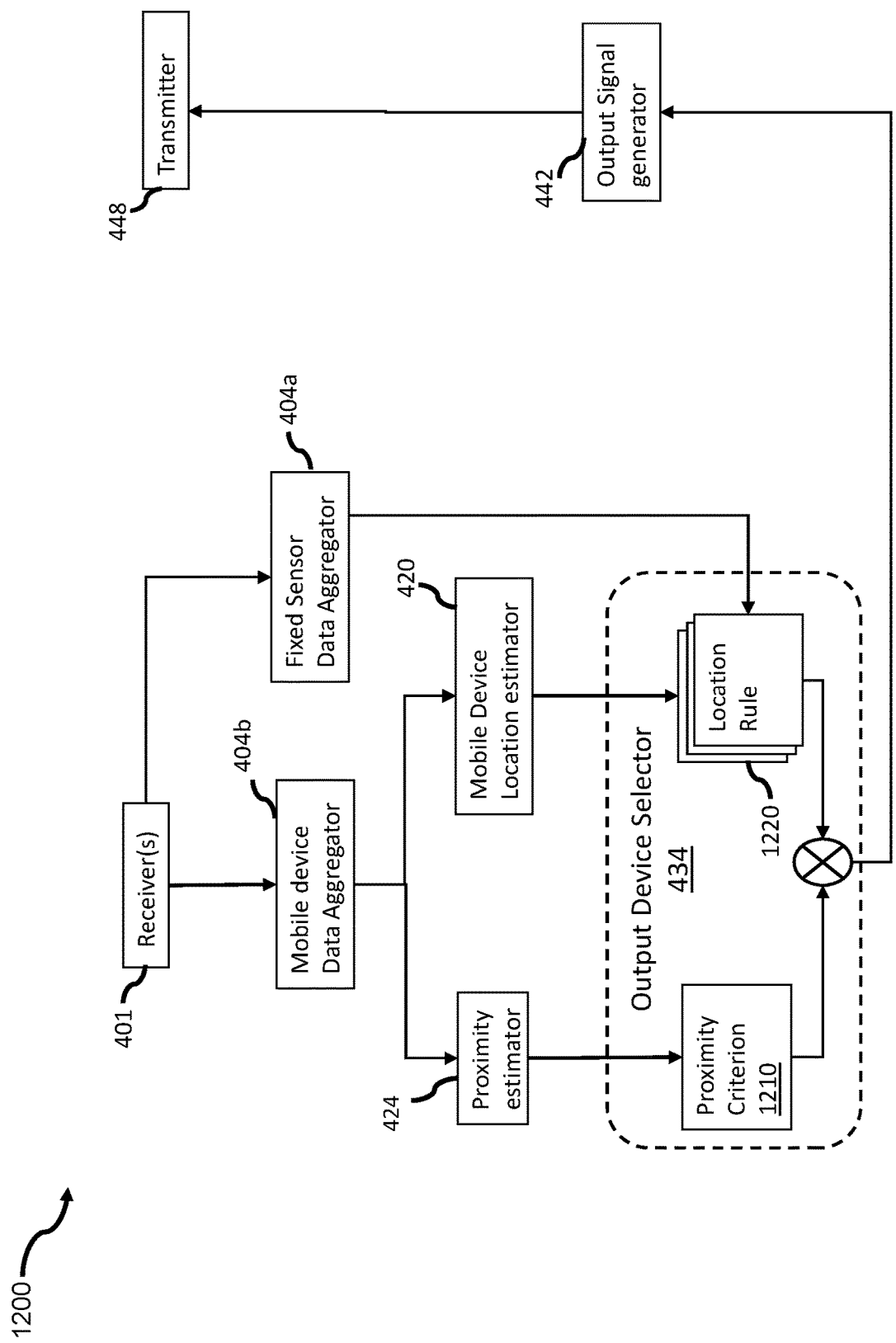
FIG. 12 illustrates a central controller operable to control a plurality of output devices in a building based.

FIG. 12A illustrates a central controller operable to control a plurality of output devices in a building based. The central controller automates the output devices based in part on satisfying a proximity criterion indicating that a person is proximal to a mobile wireless device and a device location-based criterion on the indoor location of the mobile wireless device. In several applications that central controller can benefit from knowing for a plurality of mobile wireless devices the person-to-mobile device proximity estimate and the corresponding indoor location estimates. For example the central controller can quickly determine which of a plurality of mobile wireless devices (e.g. a smartwatch and a smartphone) has the greater proximity estimate (e.g. is being carried) and automate the output device in accordance that device location.

Central controller 1200 can comprise one or more receivers 401. Receivers 401 can be wireless receivers 402 or wired receivers (e.g. an Ethernet transceiver or an CANBUS receiver). Receivers 401 can be part of transceiver pairs that include transmitters such as transmitter 448. Receivers 401 can receive mobile wireless signals 185 and first signals 140 from fixed wireless sensors (e.g. motion sensor a) and wired protocol signals (e.g. Ethernet signals 1110 in FIG. 11A). Central controller 150 can receive proximity data in mobile device signals. Proximity data can be sensor data from proximity sensors in the mobile wireless device, operable to indicate the proximity of a person to the mobile wireless device. Proximity data can also be an aspect of mobile device signal quality (e.g. variation in received signals strength indication RSSI, bit error rate, signal-to-noise ratio or time of flight delay). In one aspect proximity data can be unprocessed or raw data such as sound samples or vibration data and may not highlight the degree of proximity of one or more people to the mobile wireless device. Central controller can comprise a proximity estimator 424 to process the proximity data and generate a proximity estimate indicative of a peak indication of proximity. For example a person may sporadically make noise in the vicinity of a smartphone and the proximity estimator 424 can keep track of the peak sound volume to estimate the range of the person. A proximity estimate can be an aggregate score (e.g. 80 out of 100) based on processing proximity data from multiple sensors reported in mobile wireless device signals. A proximity estimate can be a determination of proximity on some predefined scale such as proximity estimate=10 indicating that a device is experiencing direct user interaction, while a proximity estimate of 5 indicates the mobile device hears a person in the vicinity and a proximity estimate of 1 indicates that a mobile device has been interacted with in the last 5 minutes but is not experiencing direct user interaction. A proximity estimate be a measure of a degree of activity (e.g. Handheld, On-body, On a flat horizontal surface).

Central controller 1200 can further comprise an output device selector 434. The output device selector can first assess a proximity criterion 1210 on each proximity estimate (e.g. a condition that is satisfied if the mobile wireless device is being carried on or by a user). Output device selector 434 selector obtain device one or more device selection criteria 1220 corresponding to a number of output devices. Device selection criteria can be rules for selecting a device learned over time based on data reported to the central controller regarding user behavior. Device selection criteria can also be learned from looking across a wide installation base of similar output devices. Device selection criteria can correspond to a particular output device. In the embodiment of FIG. 12A the central controller can select an output device with device selector 434 when a mobile wireless device satisfies both the proximity criterion and the device selection criterion corresponding to the output device. In central controller 1200 in response to satisfaction of a proximity criterion by a proximity estimate and satisfaction of a device selection criterion corresponding to a first output device the central controller generates output signals configured to control and aspect of the first output device. Finally central controller 1200 comprises one or more transmitters 448 to transmit the output signals to the first output device.

In one aspect central controller 1200 can implement complex proximity criteria 1210 based on knowledge of the population of mobile wireless devices in a building. For example, the central controller can track the mobile wireless device with the greatest overall proximity estimate.

While the above description contains many specificities, these should not be construed as limitations on the scope of any embodiment, but as exemplifications of various embodiments thereof Many other ramifications and variations are possible within the teachings of the various embodiments. Thus the scope should be determined by the appended claims and their legal equivalents, and not by the examples given.

The invention claimed is:

1. A method comprising:
obtaining proximity indications from a mobile wireless device, the proximity indications being indicative of one or more people in a vicinity of the mobile wireless device, processing the proximity indications to generate a proximity estimate, wherein the proximity estimate functions as a measure of proximity of the one or more people to the mobile wireless device,
obtaining for the mobile wireless device a mobile device location estimate, determining an occupancy estimate for a region of a building by weighing the mobile device location estimate according to the proximity estimate, generating an output signal,
wherein an aspect of the output signal is based on the occupancy estimate, wherein the output signal is operable to control an aspect of an output device, and transmitting from a transmitter the output signal,
wherein the weighing of the mobile device location estimate according to the proximity estimate is relative to a mobile device location estimate of at least one other mobile wireless device.

2. The method of claim 1 further comprising:
receiving at a central controller mobile device signals from the mobile wireless device, wherein the mobile device signals comprise the proximity indications and
obtaining the mobile device location estimate at least in part by processing the mobile device signals.

3. The method of claim 1, wherein the mobile device location estimate is obtained by processing short range wireless signals received from the mobile wireless device.

4. The method of claim 1, wherein the output device is located in the region of the building.

5. The method of claim 1, wherein occupancy estimate further functions to at least in part determine a location associated with the region of the building.

6. The method of claim 1, further comprising selecting a size for the region based at least in part on the proximity estimate.

7. A method comprising:
obtaining a proximity estimate, that functions as a measure of proximity of one or more people to a mobile wireless device,
wherein the proximity estimate is based at least in part on proximity indications measured by the mobile wireless device, capable of indicating one or more aspects of the one or more people,
obtaining for the mobile wireless device a mobile device location estimate, processing the mobile device location estimate according to the proximity estimate, and thereby determining at least in part an occupancy estimate for a region of a building, generating an output signal, wherein an aspect of the output signal is based on the occupancy estimate,
wherein the output signal is operable to control an aspect of an output device, and transmitting from a transmitter the output signal,
wherein the processing of the mobile device location estimate according to the proximity estimate functions to determine whether the mobile device location estimate is indicative of a location of the one or more people.

8. The method of claim 7, wherein the output device is located in the building.

9. A central controller comprising:
a. circuitry to receive proximity indications, indicative of one or more people in a vicinity of a mobile wireless device,
b. a proximity estimator to process the proximity indications and thereby generate a proximity estimate, that functions as a measure of proximity of the one or more people to the mobile wireless device,
c. a mobile device location estimator to generate a mobile device location estimate,
d. an occupancy estimator to process the mobile device location estimate according to the proximity estimate, and thereby at least in part determine for each region of one or more regions of a building a corresponding occupancy estimate,
e. an output signal generator to generate an output signal wherein at least one aspect of the output signal is based on the occupancy estimate for at least one of the one or more regions of the building, wherein the output signal is operable to control an aspect of an output device, and
f. a transmitter to transmit the output signal from the central controller,
wherein the occupancy estimator is configured to use the proximity estimate to determine whether the mobile device location estimate is indicative of a location of the one or more people.

10. The central controller of claim 9, wherein the output device is located within the one or more regions of the building.

11. The central controller of claim 9, wherein at least some of the proximity indications are based on an aspect of signal quality of short range wireless signals received from the mobile wireless device, from a set of signal quality aspects consisting of received signal strength indication, multipath interference, bit error rate, signal to noise ratio and time of flight delay.

12. The central controller of claim 9 wherein the proximity estimate further functions to at least in part determine a size for at least one of the one or more regions of the building.

13. The central controller of claim 9,
wherein the circuitry comprises a short range wireless receiver
wherein the proximity indications are received by the circuitry in short range wireless signals from the mobile wireless device, and
wherein the transmitter transmits the output signal as a short range wireless signal.

14. The central controller of claim 9, wherein the circuitry comprises one or more receivers,
wherein at least one of the one or more receivers receives first signals from one or more fixed wireless sensors, wherein the first signals are transmitted from the one or more fixed wireless sensors as short range wireless signals,
wherein the first signals comprise first data, and the first data is indicative of occupancy in at least a portion of the building, and
wherein for at least one region of the one or more regions of the building the corresponding occupancy estimate is based at least in part on at least some of the first data.

15. The central controller of claim 14, wherein the occupancy estimate corresponding to a first region of the one or more regions of the building is based at least in part on the first data.

16. The method of claim 1 wherein the weighing of the mobile device location estimate according to the proximity estimate is relative to a device location estimate of a fixed wireless sensor in the building.

* * * * *